(12) United States Patent
Ueyanagi

(10) Patent No.: US 6,700,856 B2
(45) Date of Patent: Mar. 2, 2004

(54) OPTICAL HEAD, MAGNETO-OPTICAL HEAD, DISK APPARATUS AND MANUFACTURING METHOD OF OPTICAL HEAD

(75) Inventor: Kiichi Ueyanagi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 422 days.

(21) Appl. No.: 09/745,739

(22) Filed: Dec. 26, 2000

(65) Prior Publication Data

US 2001/0009541 A1 Jul. 26, 2001

(30) Foreign Application Priority Data

Dec. 28, 1999 (JP) .......................................... 11-375233

(51) Int. Cl.$^7$ ................................................ G11B 7/00
(52) U.S. Cl. ................................... 369/112.23; 369/118
(58) Field of Search ........................ 369/112.01, 44.23, 369/44.24, 118, 112.28, 112.23

(56) References Cited

U.S. PATENT DOCUMENTS

| | | | | | |
|---|---|---|---|---|---|
| 5,590,110 | A | * | 12/1996 | Sato ....................... | 369/112.23 |
| 5,883,872 | A | * | 3/1999 | Kino ....................... | 369/112.23 |
| 6,055,220 | A | * | 4/2000 | Mamin et al. .......... | 369/112.23 |
| 6,359,852 | B1 | * | 3/2002 | Ueyanagi ............... | 369/112.23 |
| 6,498,776 | B1 | * | 12/2002 | Nakano et al. ........ | 369/112.23 |

FOREIGN PATENT DOCUMENTS

JP          A 11-250460         9/1999

OTHER PUBLICATIONS

"Near Field Nanophotonics Handbook," *The Optronics Co., Ltd.*, 1997, pp. 177–182.

H. Kubota, "Optics," *Iwanami Shoten, Publishers*, 1978, p. 283.

N. Murayama et al., "Optical Disk Technology," *Radio Technology Co., Ltd.*, 1998, p. 95.

T. Matsumoto et al., "An Efficient Probe With a Planar Metallic Pattern for High–Density Near–Field Optical Memory," *The 6$^{th}$ Int. Conf. On Near Field Optics and Related Techniques 2000*, No. Mo013, 2000.

R. Grober et al., "Optical Antenna: Towards a Unity Efficiency Near–Field Optical Probe," *Appl. Physics Lett.*, vol. 70, No. 11, 1997, pp. 1354–1356.

T.J. Silva et al., "Scanning Near–Field Optical Microscope for the Imaging of Magnetic Domains in Optically Opaque Materials," *Appl. Physics Lett.*, vol. 65, No. 6, 1994, pp. 658–660.

* cited by examiner

*Primary Examiner*—Nabil Hindi
(74) *Attorney, Agent, or Firm*—Oliff & Berridge, PLC

(57) ABSTRACT

A laser beam emitted from a semiconductor laser enters an incident surface of a transparent condensing medium with a central part of the laser beam being shielded by a shading metal member, and a light spot is formed on a light-condensed surface of the transparent condensing medium. When this light spot is applied to a micro metal member, plasmon of the micro metal member is excited, and near field light leaks out therefrom. The near field light enters a recording medium of a disk as propagation light, and record into and reproduction from the recording medium is performed by this light. By shielding the central part of the laser beam, it is possible to prevent the propagation light from being generated from the light-condensed surface of the transparent condensing medium, and to prevent erroneous reproduction caused by the propagation light.

21 Claims, 17 Drawing Sheets

FIG. 14A
FIG. 14B
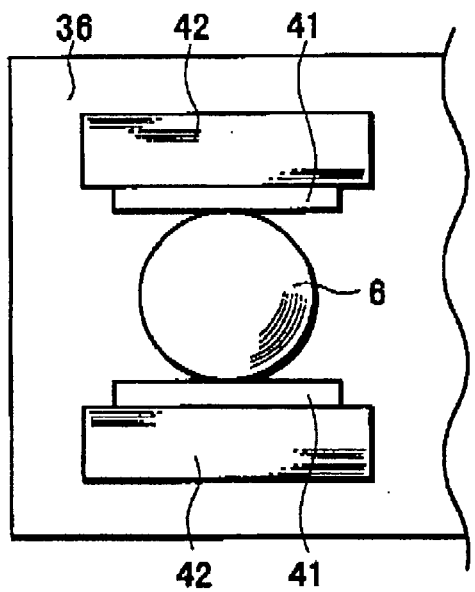
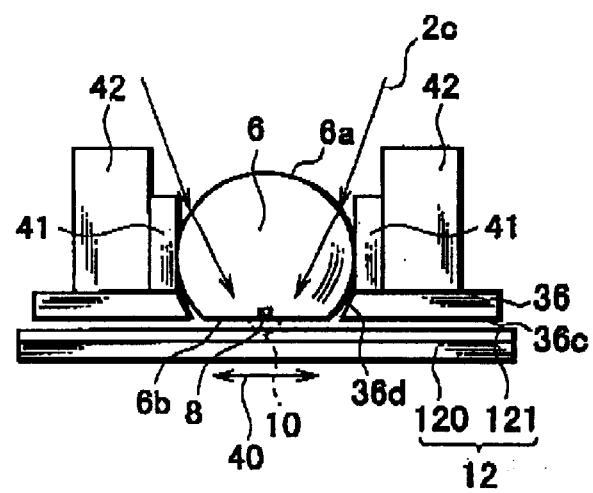
FIG. 14C
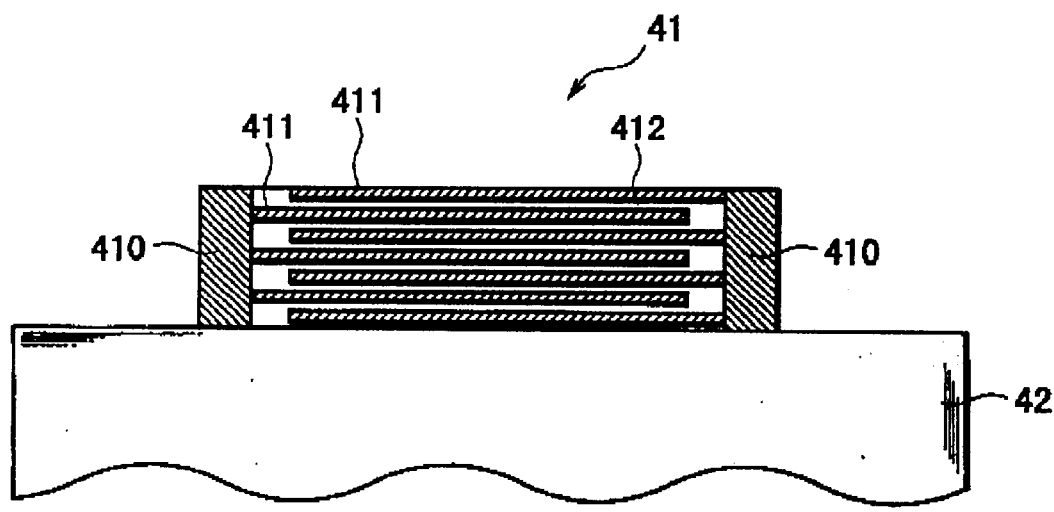

OPTICAL HEAD, MAGNETO-OPTICAL HEAD, DISK APPARATUS AND MANUFACTURING METHOD OF OPTICAL HEAD

BACKGROUND OF THE INVENTION

1. Field of the Invention

The present invention relates to an optical head, a magneto-optical head, a disk apparatus, and a manufacturing method of the optical head, and in particular, relates to an optical head, a magneto-optical head, and a disk apparatus, that have high optical efficiency, can realize high-density recording media and perform high-speed recording and reproduction, and can prevent erroneous reproduction, and a manufacturing method of the optical head.

2. Related Art

Recently, to improve the recording density of a magneto-optical disk or a magnetic disk, which records data with light and a magnetic field, or an optical disk, which records data only with light, reducing a spot size of the near field light used for record or reproduction has been investigated.

As conventional disk apparatuses using this miniaturized near field light, there are what are shown in, for example, Japanese Patent Laid Open No. Hai 11-250460 (1999).

FIG. 16 shows the disk apparatus. This disk apparatus 80 has clear lens-like holding member 81 that is a transparent condensing medium, a laser source 83 emitting a laser beam 83a at an oblique angle to an incident surface 81a of the holding member 81, a scattering member 82 that is provided on a bottom surface 81b of the holding member 81 and has the size that is equal to or smaller than a wavelength of the beam, and a photo detector 89 detecting reflected light 87 from an optical disk 85 through an objective lens 88. In the disk 80 configured in this manner, the laser beam 83a from the laser source 83 is made to enter the incident surface 81a at an oblique angle so as to be totally reflected at the bottom surface 81b of the holding member 81 to be condensed and applied at a position of the scattering member 82. The plasmon resonance is generated in the scattering member 82, and a scattered light (near field light) 84 generated therefrom enters to a recording film 86 of the optical disk 85. Then, reflected light 87 from the recording film 86 is guided to the photo detector 89 by the objective lens 88 and detected by the photo detector 89. Since it is possible to obtain the near field light 84 with the minute size that is a fraction of one or less of the size in a case of only the holding member 81, it is possible to increase recording density.

According to a conventional disk apparatus, since the laser beam 83a enters the holding member 81 at an oblique angle, the irradiated area with the laser beam 83a at the incident surface 81a of the holding member 81, and so the numerical aperture of the incident laser beam becomes small. Hence optical efficiency becomes low. This causes a problem that a high-power light source becomes necessary, and a photo detector for reproduction becomes large.

On the other hand, if a laser beam is applied right above the holding member 81, the surface 81a of the holding member 81 becomes wide. Although optical efficiency is increased in this case, there is a probability of erroneously reproducing another recording area caused by the propagation light leaking out from a light spot position of the light-condensed surface 81b.

FIG. 17 shows a metal structure described in the Dig. of the 6th Int. Conf. on Near-Field Optics and Related Tech. 2000, No. MoO13 (2000). As shown in FIG. 22, the metal structure consists of small metal bodies 91a and 91a' faced each other with a small gap 9 between them. The width of apexes 91b and 91b' of the metal bodies and the gap 91c are about 20 nm and far less than the wavelength of incident laser beam 92.

By arranging the polarization direction of the incident laser beam 92 to cross over the gap, a surface plasmon is excited in the metal bodies 92a and 92a' and vibrated in the direction parallel to the polarization direction, and electric charges having opposite polarities with each other in the apexes 92b and 92b' causes dipole and the dipole generates the plasmon effectively. The induced electric charges which constitute an electric dipole, generate a strong near-field light 93 effectively, the size of which is nearly equal to that of the gap 92c.

The simulation rest shows that the dipole excited emit a near-field list which intensity is 2300 times larger than that of the incident light and is emitted only around the gap 91c. An experimental result about micro wave radiation with a dipole antenna (R. D. Grober et al.: Appl. Phys. Lett., Vol. 70, No. 11, (1997) p. 1354) shows that the radiation occurs only around the gap region. The reason is that the antenna acts as a shield for the incident microwave because the conductivity of the metal antenna is so high enough to induce a strong dipole and the dipole has a strong shield effect.

In the case of the visible frequency region, the most of the incident wave passes side of the metal shade without coupling to the metal shade and is emitted out from the bottom surface of the transparent condensing medium, because the conductivity of the meal shade is not high enough to shield the incident wave, and the spot size of the incident is fairly larger than the size of the metal and its gap. Further to incident beam of the prior art bodies vertically, so the component of the propagation light of the light leaking out from a light spot is much more than the component of the near field light. The propagation light becomes the background noise of the optical recording and reproducing the near field light. In FIG. 17, The poised beam 92b, i.e. propagation light, irradiates and affects a recording medium when the medium is placed just under the metal bodies 92a and 92a for applying the near-field light for recording, which prevents the near-field light to make recorded marks even if the size of the near-field light could be small enough.

SUMMARY OF THE INVENTION

The present invention has been made in view of the above circumstances and provides an optical head, a magneto optical head, and a disk apparatus that have high optical efficiency, and can realize high-density recording media and perform high-speed recording and reproduction, and a manufacturing method of the optical head.

In addition, the present invention also provides an optical head, a magneto-optical head, and a disk apparatus and a manufacturing method of the optical head that can prevent erroneous reproduction.

According to a first aspect of the present invention, an optical head includes: a laser emits a laser beam; an optical system that has a transparent condensing medium which condenses the laser beam from the laser source and forms a light spot on a light-condensed surface of the transparent condensing medium; a shade provided in an optical path of the laser beam from the laser to the transparent condensing medium and shields a central part of the laser beam and a micro metal member provided so that at least part of the micro metal member is in a position where the light spot is formed and the size of the part of the metal member is smaller than that of the light spot.

According to the above configuration, the laser beam emitted from the laser source enters the transparent condensing medium with its central part being shielded by the shade, and forms the light spot on the light-condensed surface. Since the central part of the laser beam emitted from the laser source is shielded, the propagation light can be prevented from leaking out from the light-condensed surface. When the laser beam is irradiated to the micro metal member provided at a position of the light spot being formed, the plasmon is excited in the micro metal member is excited and near field light having one-digit or higher of multiplication of intensity in comparison with an incident beam is generated. By irradiating a recording medium with this near field light, recording and reproduction becomes possible. Since the size of the near field light is almost the same as the size of the micro metal member, by reducing the size of the micro metal member to reduce the size of the near field light, high-density recording becomes possible.

According to another aspect of the present invention, an optical head includes: a laser emitting a laser beam whose light intensity in a central part is lower than that in a periphery; an optical system that has a transparent condensing medium which condenses the laser beam from the laser source and forms a light spot on a light-condensed surface of transparent condensing medium; and a micro metal provided so that at least a part of micro metal member is in a position where the light spot is formed and the size of the part of the micro metal member is smaller than that of the light spot.

According to another aspect of the present invention, an optical head include: a laser emitting a laser beam; an optical system that has a transparent condensing medium which has a incident surface and a light-condensed surface and condenses the laser beam from the laser and forms a light spot on the light-condensed surface of the transparent condensing medium; and a micro metal member that is provided so that at least a part of the micro metal member is in a position where the light spot is formed and the size of the part of the micro metal member is smaller than the size of the light spot. The optical system has a numerical aperture of 0.8 or more of the laser beam entering the incident surface.

Another aspect of the present invention provides a magneto-optical head including: a laser emitting a laser beam; an optical system that has a transparent condensing medium which condenses the laser beam from the laser source and forms a light spot on a light-condensed surface of the transparent condensing medium; a shade provided in an optical path of the laser beam from the laser to the transparent condensing medium and shields a central part of the laser beam; a micro metal member provided so that at least a part of the micro metal member is in a position where the light spot is formed and the size of the part of the micro metal member is smaller than that of the light spot, an electromagnet that is provided near the micro metal member and generates a modulated magnetic field according to recorded information; and a magnetic resistive sensor detecting the recorded information as magnetic information.

According to another aspect of the present invention, a disk apparatus includes: a disk on which a recording medium is formed a laser emitting a laser beam; an optical system that has a transparent condensing medium which condenses the laser beam from the laser and forms a light spot on a light-condensed surface of the transparent condensing medium; a shade provided in an optical path of the laser beam leading from the laser to the transparent condensing medium and shields a central part of the laser beam; a micro metal member provided so that at least part of the micro metal member is in a position when the light spot is formed and the size of the part of the micro metal member is smaller than that of the light spot; and a moving mechanism relatively moving light outgoing from the micro metal member to the recording medium.

According to another aspect of the present invention a disk apparatus includes: a disk on which a recording medium is formed; a laser emitting a laser beam; an optical system that has a transparent condensing medium which condenses the laser beam from the laser and forms a light spot on a light-condensed surface of the transparent condensing medium; a first shade provided in an optical path of the laser beam from the laser to the transparent condensing medium and shields a central part of the laser beam; a micro metal member provided so that at least part of the micro metal member is in a position where the light spot is formed and the size of the part of the micro metal member is smaller than that of the light spot; a moving mechanism relatively moving light emitted from the micro metal member to the recording medium; a detector detecting reflected light, based on a laser beam emitted from the laser to the recording medium through the optical system, through the transparent condensing medium; and a second shade shielding returned light lest the returned light that is part of the laser beam condensed on the light-condensed surface of the transparent condensing medium and is reflected on the light-condensed surface should enter the detector.

According to another aspect of the present invention, a manufacturing method of an optical head includes the steps of: preparing a transparent condensing medium having a light-condensed surface where a light spot is formed by an incident laser beam; covering an area except an area having the size smaller than the size of light spot on the light-condensed surface of the transparent condensing medium with photoresist; forming a concave part in the light-condensed surface by removing an area, where the photoresist is not present, in predetermined depth, which is equal to or shallower than a wavelength of the laser beam, by etching; and forming a micro metal member by depositing metal material in the concave part.

According to another aspect of the present invention a manufacturing method of an optical head includes the steps of: preparing a transparent condensing medium having a light-condensed surface where a light spot is formed by an incident laser beam; and forming a micro metal member, having the size smaller than the size of the light spot, by depositing a metal film in a central part of the light spot on the light-condensed surface of the transparent condensing medium by a focused ion beam method.

BRIEF DESCRIPTION OF THE DRAWINGS

Preferred embodiments of the present invention will be described in detail based on the following figures, wherein:

FIG. 7C is its side view;

FIGS. 14A to 14C are schematic diagrams showing principal parts of an optical head of a disk apparatus according to a tenth embodiment of the present invention;

DETAILED DESCRIPTION OF THE PREFERRED EMBODIMENTS

Figure 1A:
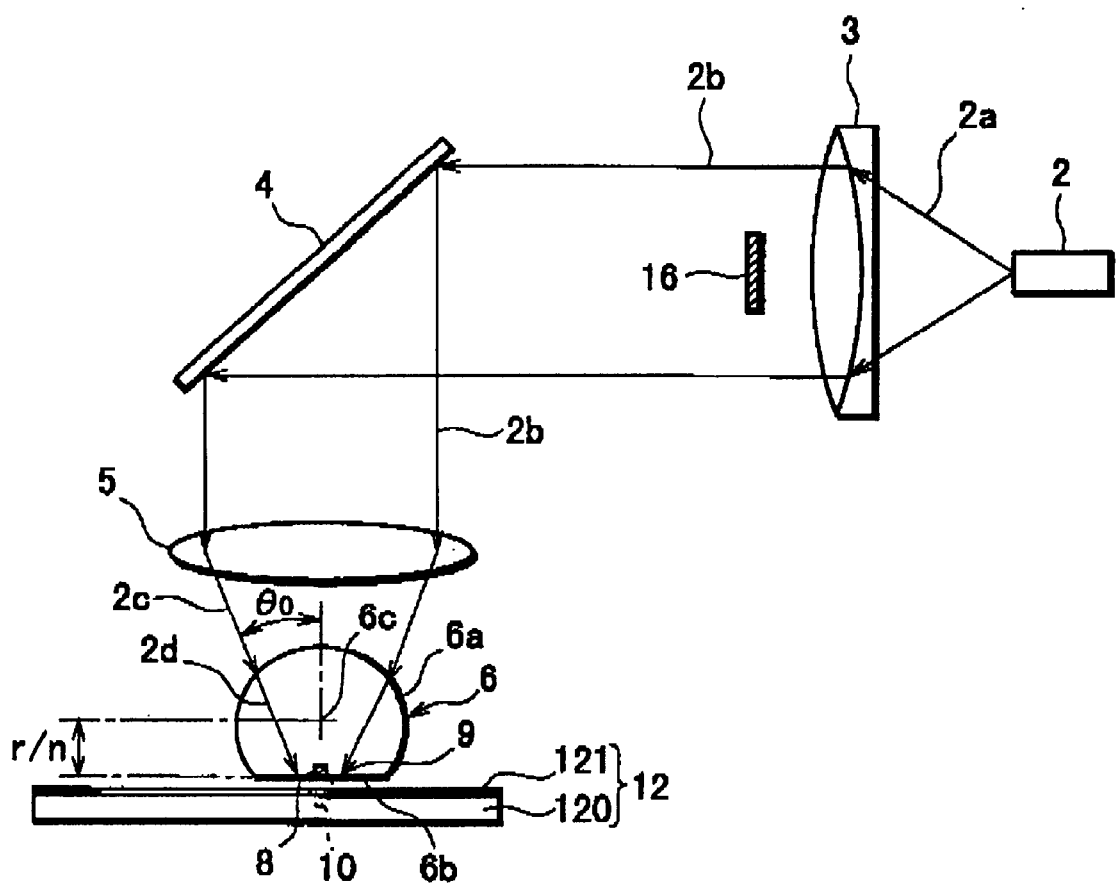
FIG. 1A is a schematic diagram showing a principal part of a optical head according to a first embodiment of the present invention.

FIG. 1A shows a principal part of an optical head 1 according to a first embodiment of the present invention. This optical head 1 has a semiconductor laser 2 emitting a laser beam 2a, a collimator lens 3 shaping the laser beam 2 from the semiconductor laser 2 into a parallel beam 2b, a shade 16 shielding a central part of the parallel beam 2b from the collimator lens 3, a mirror 4 reflecting the parallel beam 2b, whose central part is shielded by the shade 16, in a vertical direction, an objective lens 5 converging the parallel beam 2b reflected by the mirror 4, a transparent condensing medium 6 into which light 2c converged by the objective lens 5 enters and that forms a light spot 9 on a light-condensed surface 6b, and a micro metal member 8 provided at a forming position of the light spot 9 that is near the light-condensed surface 6b of the transparent condensing medium 6.

As the semiconductor laser 2, a red laser (630 nm) or an AlGaInN blue laser (400 nm) can be used. By using the blue 1 (400 nm), it is possible to make the diameter of a light spot be equal to or smaller than 0.13 µm and hence it is double to increase quantity of the light illuminating the micro metal 8. In addition, it is possible to use a laser that oscillates in parallel to an active layer by using a cleavage plane of a semiconductor for a laser for an optical resonator, that is, a so-called edge emitting semiconductor laser, or a laser that oscillates in a direction perpendicular to the active layer by a resonator formed in parallel to the active layer, that is, a so-called surface emitting semiconductor laser, as the semiconductor laser 2. If the edge emitting semiconductor laser is used, it is possible to shorten the distance from the collimator lens 3 because of a large beam flare age, and hence it is possible to miniaturize the optical head. In addition, if the surface emitting semiconductor laser is used, it is possible to condense light with reducing the vignetting in the collimator lens 3 because an output beam is round, and hence it is possible to increase opt efficiency.

In this embodiment, a medium having a bottom-cut-ball shape (super SIL structure) is used as the transparent condensing medium 6 so that the converged light 2c from the objective lens 5 is refracted on the spherical incident 6a and refracted light 2d is condensed on the micro metal member 8 in the light-condensed surface 6b. In addition, it is possible to use dense flint glass (refractive index=1.91), or crystalline material such as cadmium sulfide CdS (refractive index= 2.5), and zinc blends ZnS (refractive index=2.37) as the transparent condensing medium 6. Furthermore is no upper limit of the refractive index so long as the refractive in is larger than 1, and material with it further high refractive index can be also glass having a refractive index 1.91 is used. By using the crystalline material it becomes possible to reduce the diameter of a light spot by twenty percent or more than that in the dense flint glass.

The spot diameter of the light spot 9 is expressed by the following equation (1) if light is condensed at a position whose distance is r/n (r, n: a radius and refractive index of the transparent condensing medium 6 respectively) from a spherical center 6c:

$$D_{1/2} = k\lambda/(n \cdot NAi) = k\lambda/(n^2 \cdot NAo) \tag{1}$$

wherein, $D_{1/2}$: Spot diameter at a position where light intensity becomes one-half k: proportional constant depending on light beam intensity profile (usually, nearly 0.5)

λ: Wavelength of light beam n: Refractive index of the transparent condensing medium 6

NAi: Numerical aperture inside the transparent condensing medium 6

NAo: Numerical aperture of incident light to the transparent condensing medium 6

The light spot 9, as shown in equation (1), is decreased in inverse proportion to the refractive index n of the transparent condensing medium 6, so it becomes possible to condense light with small spherical aberration. Nevertheless, there is contradictory relation between an available incident angle θ of converged light 2c, that is, the numerical aperture NAo, and the refractive index n, therefore it is not possible to enlarge both number separately. A product of the refractive index n and the maximum value of the NAo is nearly 0.88, and actually this becomes 0.8 or less due to the eclipse of a beam. Therefore, the minimum diameter $D_{1/2}$min of a light spot is expressed in the following equation (2):

$$D_{1/2}\text{min} = k\lambda/(0.8n) \approx 0.6\lambda/n \text{(at } k=0.5\text{)} \tag{2}$$

If the dense flint glass having the largest refractive index (=1.91) in non-crystals is used for transparent condoning medium 6 and a red laser (wavelength=630 nm) is used as the semiconductor laser 2, the minimum diameter of a light spot $D_{1/2}$min is 0.20 μm. Or, if a blue laser (400 nm) is used, the minimum diameter of a light spot $D_{1/2}$min is nearly 0.13 μm. Therefore, their light spots 9 approximately have Gaussian intensity divergence distribution.

Figure 1B:
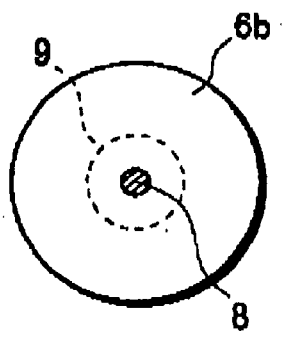
FIGS. 1B to 1F are diagrams showing shapes of micro metal bodies.
Figure 1C:
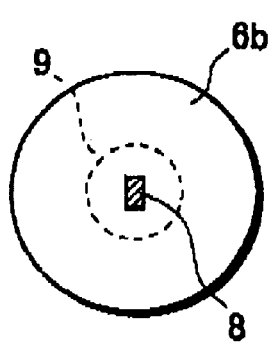
Figure 1D:
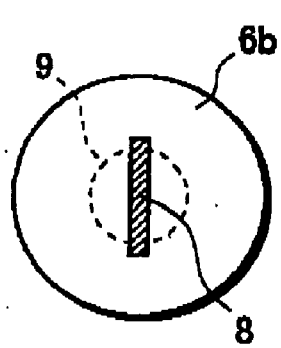

The micro metal member 8 is embedded in the light-condensed surface 6b of the transparent condensing medium 6 as shown in FIG. 1A. Although, in this embodiment, a shape of the micro metal member 8 is around as shown in FIG. 1B. The shape, as shown in FIG. 1C, can be also a rectangle smaller than the diameter of the light spot 9 or a rectangle longer than the diameter of the light spot 9 or another shape, for example, an ellipse as shown in FIG. 1D.

Figure 1E:
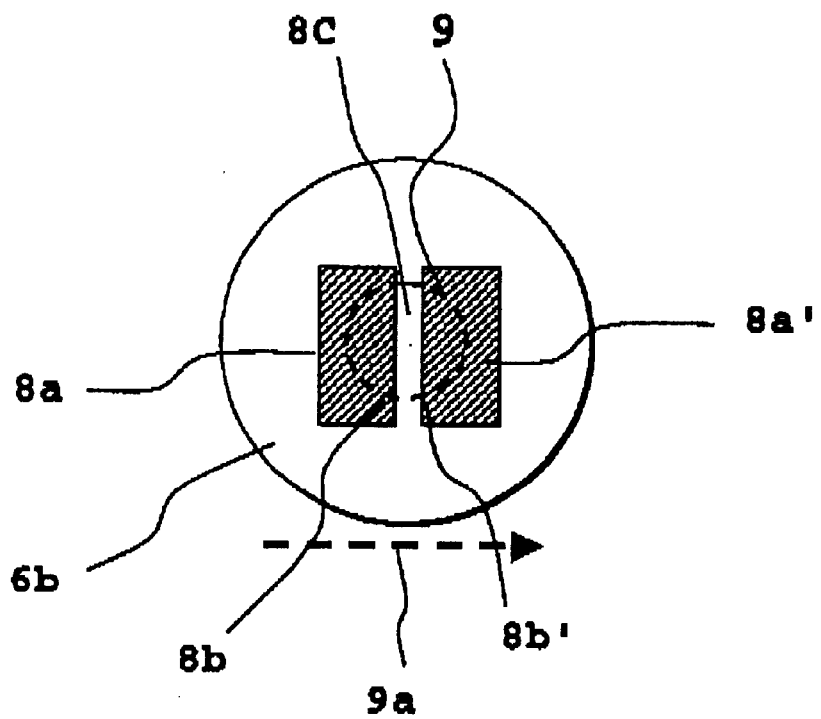

As shown in FIG. 1(e), a pair of metal members, which face each other in the light spot 9 and construct a slit-like gap 8c can be applied. The direction of the longer side of the gap 8c is larger than the size of the laser spot 9 and placed to across the recording track (not shown in the figure). By irradiating the gap 6c with the converging incident beam 2d and arranging the polarization 9a of the converging incident beam 2d to across the gap 8c, as shown in the same figure electric charges having opposite polarities with each other are induced effectively with the plasmon in the both outer sides of gap 8b and 8b', respectively. The induced electric charges construct an electric dipole, which generates a strong near-field light effectively, the length of the near field light region is nearly equal to that of the gap 8c. The position of the near-field light can be scanned without changing its size and intensity by scanning the converging incident beam 2d parallel to the longer sides of gap 8c, which is suitable for high speed tracking of the recording tracks with the near-field light.

Figure 1F:
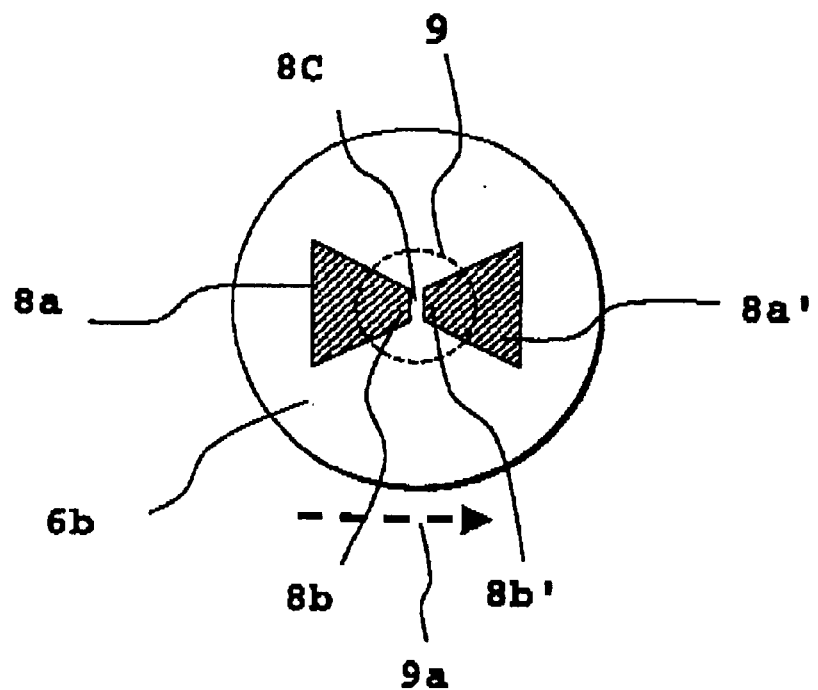

As shown in FIG. 1(f), another type of a pair of the opposite metal members which has an aperture 8d in it can also be applied, where the central part of the aperture is narrowed to construct a slit-like-gap 8c which size is far less than that of the beam spot 9. As the area of the near-field light generated with the plasmon excitation is limited around the gap 8c, both the width and length of the near-field light is miniaturized far less than the size of the beam spot 9, which makes it possible to form smaller recording marks than those obtained with the metal members, shown in FIG. 1(e).

In the process using photolithography, the micro metal member 8 having a round shape is advantageous for easy productivity. Or, by making the shape be a rectangle whose long sides are orthogonal to a tracking direction, it is possible to reduce the size of near field light spreading to the tracking direction and the length of the recording mark becomes shorter in the tracking direction in comparison with a round shape member, it becomes possible to perform the high-density record. If a shape of the micro metal member is an ellipse whose ellipse axis is parallel to the direction orthogonal to the tracking direction, not only the length of the recording mark in the tracking direction becomes short but also the generation of near field light caused by plasmon resonance is increased. Therefore, it becomes possible to reduce an input level. In this embodiment, the outside diameter of the micro metal member 8 is 50 nm. The size of the near field light 10 leaking out from the light-condensed surface 6b is almost determined by the size of the micro metal member 8, and hence becomes 50 nm. In addition, the size of the micro metal member 8 can be reduced to the size less than 50 nm according to the progress of high-density recording technology and shade forming technology for optical disks.

The micro metal member 8 is made of, for example, Ti, and has the thickness (eg., 10 nm) smaller than a wavelength of a laser beam. The micro metal member 8 can be made of any material which has good adherence to the transparent condensing medium 6. In particular, by using metal having small dielectric constant, such as metal Ag, it is possible to further close to conditions of plasmon resonance. The condition of the plasmon resonance is expressed as the following equation (3) if excitation is primary mode excitation (Reference: Near field nanophotonics handbook: Optoronics Co., Ltd., 177 (1997)):

$$Re[Em(a)]=-2-E(a) \tag{3}$$

wherein,

Em(a): Dielectric constant of the micro metal member 8

Ed(a): Dielectric constant of medium surrounding the micro metal member 8

As is evident from this equation, if an outer medium is air, a case of the dielectric constant of the micro metal member 8 being −2 fulfills the resonance condition. Under this condition, the intensity of the near field light gains several digits of multiplication. And even under a condition nw to this condition, it is possible to obtain an enhancing effect enabling one-digit or more of multiplication.

Figure 2A:
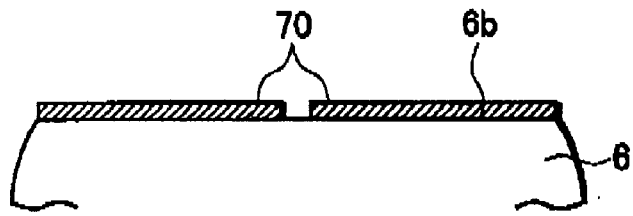
FIGS. 2A to 2D are views showing a forming method of the micro metal according to the first embodiment.
Figure 2B:
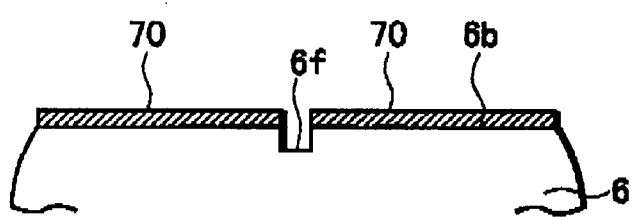
Figure 2C:
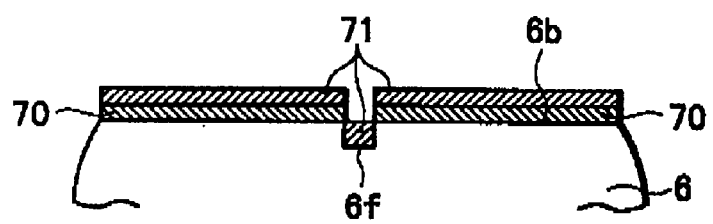
Figure 2D:
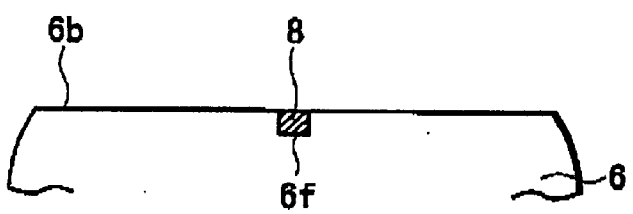

FIGS. 2A to D show a batch forming process of the micro metal member 8. First, a photoresist film for electron beam exposure is coated on the light-condensed surface 6b that is a bottom surface of the bottom-cut-ball-shaped transparent condensing medium 6. As shown in FIG. 2A, the photoresist film 70 is exposed by the electron beam so that a part of the photoresist film corresponding to the micro metal member 8 is removed. After developing as shown in FIG. 2, the light-condensing condensed surface 6b is anisotropically etched at the depth of nearly 100 Å by dry etching to form a coated surface 6f of the micro metal member 8. Etching gas used is $CF_4$ gas. Next, as sown in FIG. 2C, after a Ti film 71 for the micro metal member 8 is coated on the entire surface at the thickness of nearly 50 nm by sputtering, the photoresist film 70 is dissolved. Then, as shown in FIG. 2D, the Ti film 71 except a part of the micro metal member 8 is lifted off. In this manner, the micro metal member 8 is formed. The Ti film can be replaced by another film having good adherence to glass. By forming the micro metal member 8 so as to be embedded into the light-condensed surface of the transparent condensing medium 6, the unevenness with the light-condensed source 6b becomes small. It is preferable to fly over the recording medium 121.

Figure 2E:
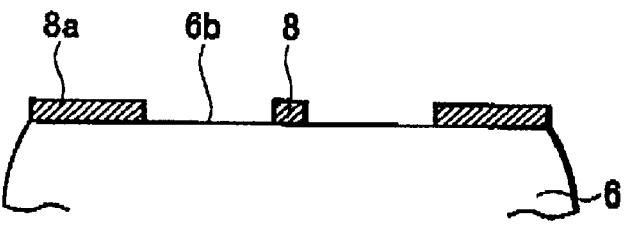
FIG. 2E is a view showing another example of a forming method of a micro metal member.

In addition, as shown in FIG. 2E, the micro metal member 8 can be formed on the light-condensed surface 6b. Owing to this, it becomes possible to form the micro metal member 8 by depositing a metal film by only the focused ion beam method, and hence it becomes possible to omit a lift-off step and to simplify the forming process. Furthermore, since a distance between the light-condensed surface 6b and recording medium 121 becomes long and the distance between the near field light from the light-condensed surface 6b and the recording medium 121 increases, it prevents recording and reproduction in this area, so it becomes possible to perform minification of a recording mark and to increase an S/N ratio of a signal. However, in this structure, a crash will be easily arisen by the micro metal member 8 contacting to the recording medium 121. In order to prevent this, as shown in FIG. 2E, a guard ring 8a made of metal or glass may be provided.

Figure 3A:
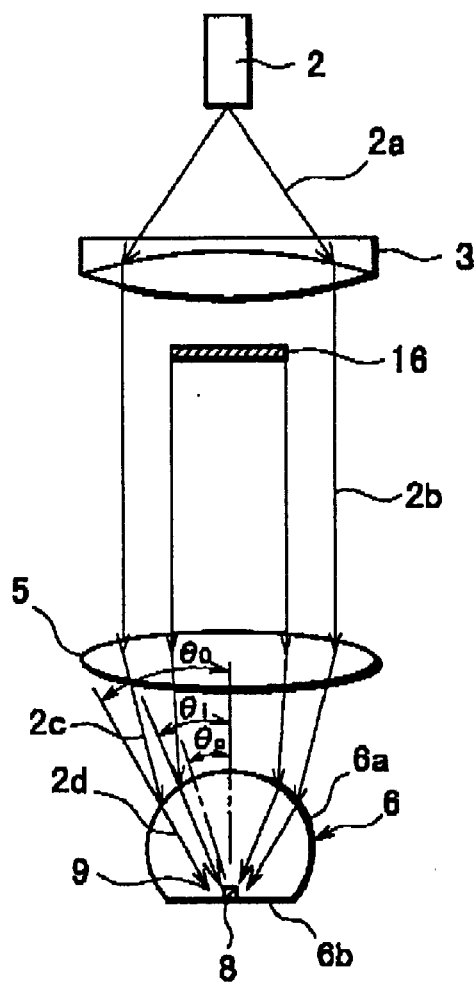
FIG. 3A is a schematic diagram showing an optical system of the first embodiment.
Figure 3B:
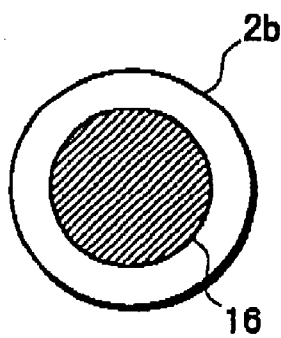
FIGS. 3B and 3C are schematic diagrams showing shapes of shades.
Figure 3C:
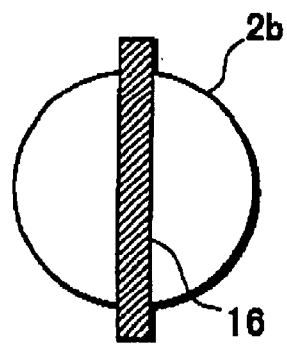

FIGS. 3A to 3C show a fundamental configuration of an optical system. In FIG. 3A, the mirror 4 is omitted, and an optical is expressed by a line. In this embodiment, the shape of the shade 16 is round as shown in FIG. 3B. The size of the shade 16 is designed so that an laser beam enters at an angle of θi that is larger than a critical angle θc. Since the laser beam 2d passing through an edge of the shade 16 is totally reflected on the light-condensed surface 6b, propagation light cannot permeate from the light-condensed surface 6b around the micro metal member 8 to the recording medium 121. In addition, since the irradiation light to the micro metal member 8 becomes total reflection light, an incident angle to the micro metal member 8 becomes large. Therefore since plasmon resonance is easily generated, the new field light is further enhanced (Reference: Near field nanophotonics, Optoronics Co., Ltd., 177 (1997)). In addition, since it is possible to realize a super resolution effect by shielding the central part of the laser beam, the diameter of the light spot 9 can be reduced nearly 20%. The shape of the shade 16 can be also rectangular whose sides are longer than the diameter of the parallel beam 2b as shown in FIG. 3C. In this case, the rectangular micro metal member 8 shown in FIG. 1D is suitable, and the plasmon excitation efficiency can be increased by arranging the longitudinal directions of both sides of the member in parallel.

Next, the operation of the optical head 1 according to the first embodiment will be described. When a laser beam 2a is emitted from the semiconductor laser 2, the laser beam 2a is collimated into a parallel beam 2b by the collimator lens 3, its central part is shielded by the shade 16, and the parallel beam 2b is reflected by the mirror 4. After that, the parallel beam 2b is converged by the objective lens 5, and incident on the incident surface 6a of the transparent condensing medium 6. Converged light 2c entered into the incident surface 6a is refracted on the incident surface 6a, and refracted light 24 is condensed on the light-condensed surface 6b, on which the light spot 9 is formed. The near field light leaks out from the light-condensed condensed surface 6b where this light spot 9 is present, and is scattered by the micro metal member 8. Further, plasmon in the micro metal member 8 is excited by irradiating the micro metal member 8 itself with the laser beam and the near field light 10 leaks out therefrom. This near field light 10 enters the recording medium 121 of the disk 12 as the propagation light, and enables recording to and reproduction from the recording medium 121.

According to the optical head 1 of the above-described first embodiment, the size of the near field light 10 becomes nearly equal to the size of the micro metal member 8. Therefore, it is possible to minify the size of the light spot of the near field light that interact with the recording medium 121.

By using the plasmon resonance, it becomes possible to increase the intensity of the near field light 10 to one digit or more of multiplication in comparison with a can that the near field light merely leaks out from a light spot on a light-condensed surface 6b. Therefore, it is possible to obtain high optical efficiency. Therefore, the semiconductor laser 2 having comparatively low power, that is, several mW can be used as a light source.

In addition, since the reflected light for signal reproduction from the recording medium 121 enter from a periphery of the micro metal member 8, the reflected light can efficiently enter the transparent condensing medium 6. Therefore, it is possible to efficiently detect reproduced light, and it is possible to an S/N ratio of a reproduced signal. In consequence, since a Si photo having been commonly used in optical disk memory can be used, it is unnecessary to use a photo multiplier. Therefore, it is possible not only to miniaturize and lighten the optical head 1, but also to perform high-speed reading.

Since the central part of the laser beam 2b emitted from the semiconductor laser 2 is shielded by the shade 16 and does not enter the transparent condensing medium 6, the generation of the propagation light from the laser beam 2b at the light-condensed surface 6 can be prevented. So, it is possible to prevent erroneous reproduction by the propagation-light.

In addition, an anti-reflection film (not shown) which is suitable to a wavelength of a laser beam can be arranged at a periphery of the micro metal member 8 on the lighted surface 6b. It becomes possible to increase incident efficiency of the reflected light for the signal reproduction into the transparent condensing medium 6.

A transmission type hologram or a distributed-refractive index type condensing-medium (not shown) can be used instead of the objective lens 5. Since it is possible to unify the hologram or distributed-refractive index type condensing medium and a transparent condensing medium, it is possible to lower the height of the optical head 1.

Figure 4A:
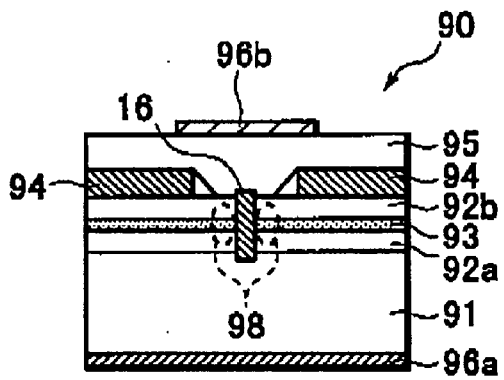
FIGS. 4A to 4E are schematic diagrams showing semiconductor lasers in an optical head according to a second embodiment of the present invention.
Figure 4B:
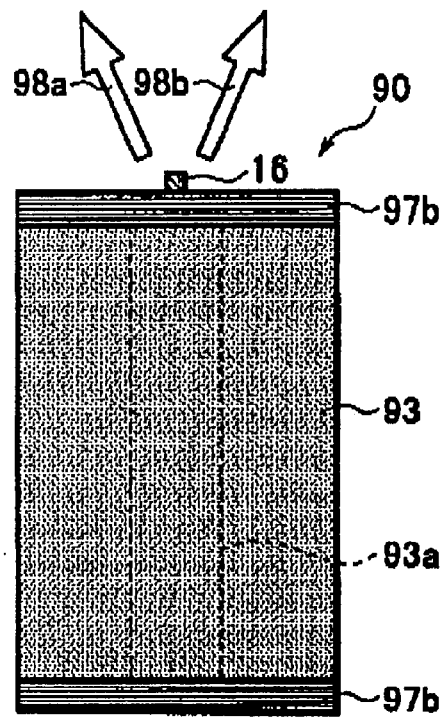
Figure 4C:
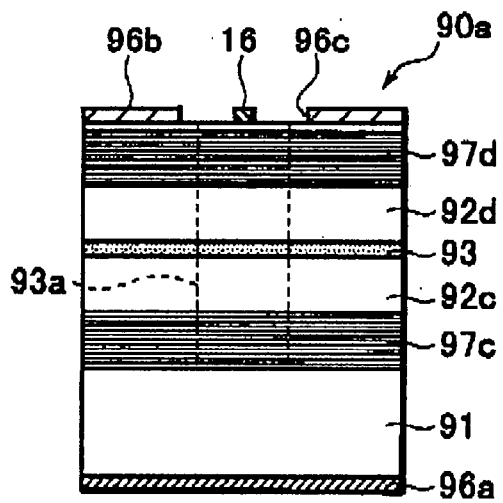
Figure 4D:
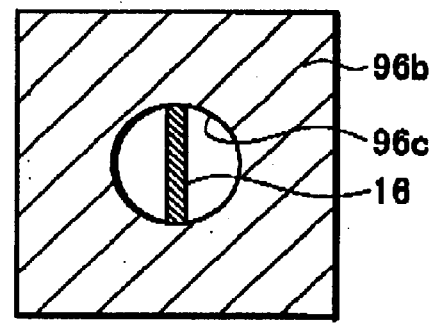
Figure 4E:
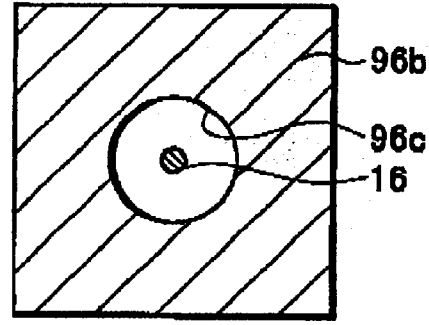

FIGS. 4A to 4E show semiconductor lasers used for an optical head according to a second embodiment of the present invention. This semiconductor laser has a shade 16 so that the 16 shields a central part of a light spot at a position of the light spot on an optical output surface of the semiconductor laser instead of the shade 16 of the first embodiment. FIGS. 4A and 4B show edge emitting semiconductor lasers, and FIGS. 4C to 4E show surface emitting semiconductor lasers.

The edge emitting semiconductor laser 90, as shown in FIGS. 4A and 4B, means a laser with buried-ridge structure restricting an oscillation area 93a by a current confining layer 94. Nevertheless, another type laser structure can be also used. This edge emitting semiconductor laser 90, as shown in FIG. 4A, includes a semiconductor substrate 91, an n-type clad layer 92a, an active layer 93, a p-type clad layer 92b, the current confining layer 94, a cap layer 95, an n-electrode 96a, and a p-electrode 96b, or, as shown in FIG. 4B, includes a highly-reflective dielectric multilayer film 97a provided in a rear and, a low-reflective dielectric multilayer film 97b provided in an output surface, and a shade 16 formed in the direction of extending a central part of an active layer 93a on the dielectric multilayer film 97b. The edge emitting semiconductor laser 90 configured in this manner is manufactured as follows. First, after stacking the n-type clad layer 92a, active layer 93 p-type clad layer 92b, current confining layer 94, and cap layer 95 on the semiconductor substrate 91, made of n-type GaAs, by epitaxial growth, the n-electrode 96a, and p-electrode 96b are formed. After that, as shown in FIG. 4B, this material is cut in proper length by cleavage. Then, for forming a resonator, the highly reflective dielectric multilayer film 97a is formed in the rear end, and the low-reflective dielectic multilayer film 97b is in the output surface. After that, the shade 16 is formed in the direction of extending from the central part of the active layer 93a on the dielectric multilayer film 97b.

The shape of the shade 16 can be round, but a rectangle is preferable because it is possible to relax vertical positional accuracy. By providing the edge emitting semiconductor laser 90 so that the longitudinal direction of the rectangle is in paralleled to the longitudinal direction of the micro metal member 8, it becomes possible to efficiently irradiate the micro metal member 8. Nevertheless, since the edge emitting semiconductor laser 90 emits a laser beam polarized in the vertical direction of the active layer 93, a polarized plane of converged light 2c would be an s-polarized wave. Therefore, by rotating the polarized plane at 90° through inserting a half wave plate in the optical path 2b, the polarized plane becomes a polarized wave. Then, it becomes possible to increase plasmon excitation efficiency. By this shade 16, oscillation in a central part of the oscillation area 93a is suppressed. An oscillation mode 98 becomes a mode having low intensity at the central, and an output direction is widen as shown by 98a and 98b. In addition, the oscillation mode becomes a TEM00 mode or a TEM01 mode according to a return rate of the shade 16. By collimating laser output light of this semiconductor laser 90 as shown in the first embodiment, condensing the light by the objective lens 5, and irradiating the transparent condensing medium 6, it is possible to obtain converged light that is totally reflected on the light-condensed surface 6b. Furthermore, at the same time this configuration has a super resolution condensation effect. Similarly to the first embodiment, a light spot with the size that is smaller by nearly 20% than a case of condensing light in the TEM00 mode can be obtained. So the propagation light permeating from the light-condensed surface 6b around the micro metal member 8 to the recording medium 121 can be prevented, and it becomes possible to minify the recording mark and to achieve a high S/N ratio of a reproduction signal. Moreover, irradiation light to the micro metal member 8 becomes the total refection light and an incident angle is increased, so the plasmon resonance is easily generated and to near field light is further strengthen (Reference: Near field nanophotonics handbook: Optoronics Co., Ltd., 177 (1997)).

FIGS. 4C to 4E show the surface emitting semiconductor laser 90a. The surface emitting semiconductor laser 90a, as shown in FIG. 4C, means laser with buried ridge structure restricting an oscillation area 93b by a current and oscillation area-confining layer 94 formed by using AsOx diffusion. Nevertheless, a laser with another structure can be used. This surface emitting semiconductor laser 90a includes a semiconductor substrate 91, an n-type semiconductor highly-reflective multilayer film 97c, an n-type spacer layer 92c, an active layer 93, a p-type spacer layer 92d, a confining layer 94a, a p-type highly-reflective multilayer film 97c, a n-electrode 96a, and a p-electrode 96b. The surface emitting semiconductor laser 90a configured in this manner is manufactured as follows. Thus, after stacking the n-type semiconductor highly-reflective multilayer film 97c for a resonator, the n-type spacer layer 92c, active layer 93, p-type spacer layer 92d, current and oscillation area confining layer 94a, and p-type highly-reflective multilayer film 97c on the semiconductor substrate 91, made of n-type GaAs, by sequential epitaxial growth, the n-electrode 96a, and p-electrode 96b are formed. At the time of forming the p-electrode 96b, as shown in FIGS. 4D and 4E, the shade 16 is simultaneously formed with metal for forming the p-electrode 96b in the direction of extending a central part of the oscillation area 93a.

Since the surface emitting semiconductor laser 90a is axial symmetry to output light, as shown in FIG. 4D, it is also good enough to provide the rectangular shade 16 so as to equally divide an aperture 96c in a light output surface of the surface emitting semiconductor laser 90a into two. In addition, as shown in FIG. 4E, the round shade 16 can be provided in a center of the aperture 96c. In this case, the mode becomes the TEM01 mode that is axial symmetry. In this manner, it is possible to obtain the same effect as case of the above-described edge emitting semiconductor laser 90. Moreover, by providing the shade 16 on a laser in this manner, it becomes unnecessary to install a shade in the optical path 2b. Therefore, it is possible to reduce some parts, and to relax alignment accuracy.

Figure 5A:
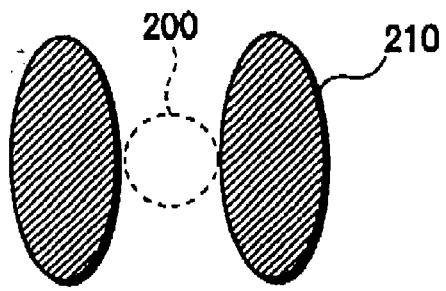
FIGS. 5A to 5D are schematic diagrams showing optical patterns by a semiconductor laser in a optical head according to a third embodiment of the present invention.
Figure 5B:
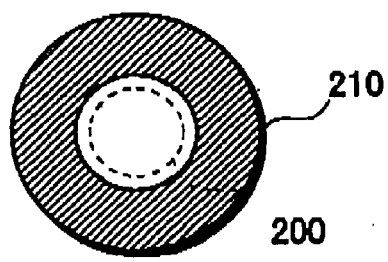
Figure 5C:
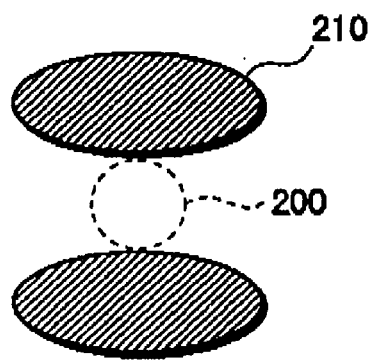
Figure 5D:
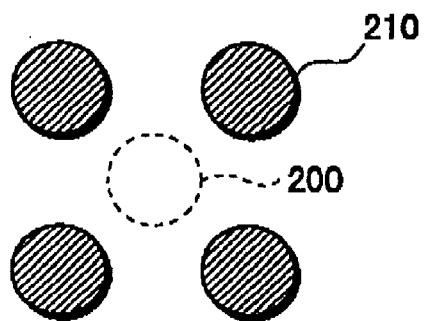

FIGS. 5A to 5D show a principal part of an optical head according to a third embodiment of the present invention. This third embodiment does not use a shade like the first and second embodiments, but uses a semiconductor emitting a laser beam whose central part has intensity lower than its periphery. FIG. 5A shows a TEM01 mode in x=0 and y=1, FIG. 5B shows the TEM01 mode r=1 and θ=0, FIG. 5C shows the TEM10 mode in x=1 and y=0, and FIG. 5D shows a TEM11 mode in x=1 and y=1. In any case, at least a central part 200 has lower light intensity, and a laser beam having light intensity necessary for recording and reproduction is emitted to a peripheral area 210 (shaded areas in FIGS. 5A–5D).

Figure 6:
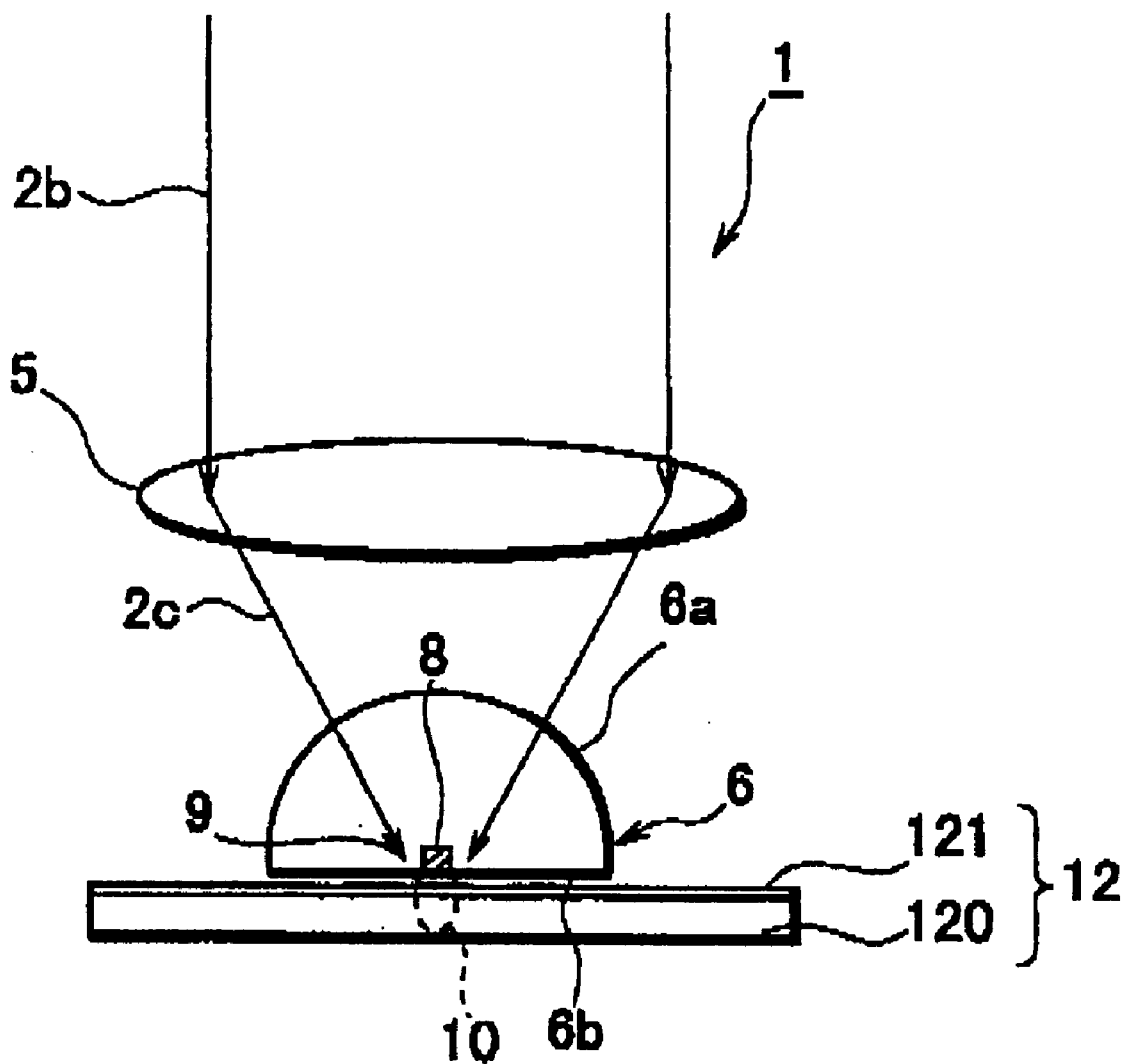
FIG. 6 is a schematic diagram showing a principal part of an optical head according to a fourth embodiment of the present invention.

FIG. 6 shows a principal part of an optical head according to a fourth embodiment of the present invention. This optical head 1 includes a transparent condensing medium shaped hemispherical (Solid Immersion Lens: SIL type), and other components are configured similarly to those in the first embodiment. Converged light 2c entering an incident surface 6a of the transparent condensing medium 6 is condensed at the center of a sphere. In this case, since the condensed light 2c is not refracted on the incident surface 6a, a numerical aperture NA in the transparent condensing medium 6 is not varied from the numerical aperture NA at the emission from the objective lens 5, so it is not possible to increase the numerical aperture NA by refraction. Hence, the diameter of a light spot at this time is determined by the following equation (4):

$$D_{1/2} = k\lambda/(n \cdot NAo) \quad (4)$$

wherein, NAo: Numerical aperture of incident light into the SIL type transparent condensing medium 6.

According to the optical head 1 of the fourth embodiment, similarly to the first embodiment, the diameter of the near field light 10 is determined by the size of the micro metal member 8, but does not depend on the depend on the diameter of the light spot 9. Therefore, since the diameter of the near field light 10 is hardly affected by aberration, positional shift, or the like, it is possible to comparatively enlarge the numerical aperture NAo to 0.8 in comparison with a case of a conventional SIL type optical head. Hence it is possible to condense light at a level equivalent to the super SIL structure in the first embodiment.

Figure 7A:
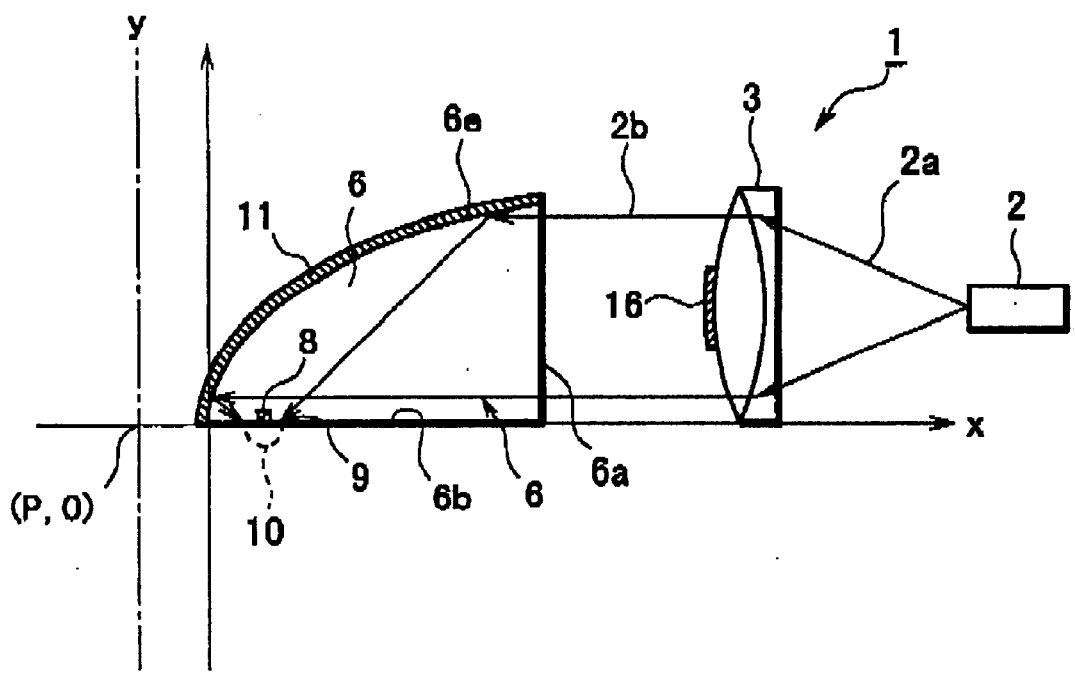
FIG. 7A is a schematic diagram showing a principal part of an optical head according to a fifth embodiment of the present invention.
Figure 7B:
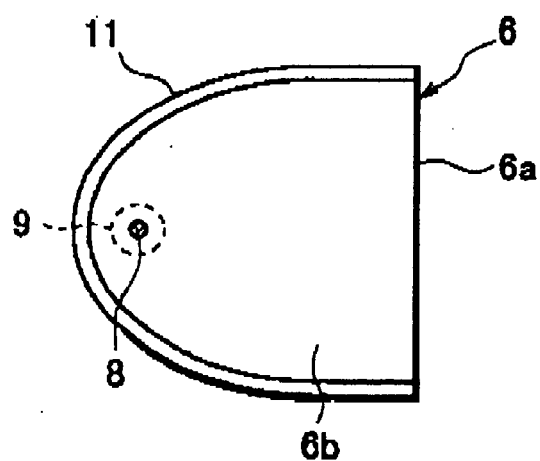
FIG. 7B is its bottom view.

FIGS. 7A and 7B show a principal part of an optical head according to a fifth embodiment of the present invention. As shown in FIG. 7A, this optical head 1 has a semiconductor laser 2 emitting a laser beam 2a, a collimator lens 3 shaping the laser beam 2a from the semiconductor laser 2 into a parallel beam 2b, a shade 16 shielding a central part of the parallel beam 2b from the collimator lens 3, a transparent condensing medium 6 that condenses the parallel beam 2b, whose central part is shielded by the shade 16, and forms a light spot 9 on a light-condensed surface 6b, a reflective film 11 coated and formed on a reflecting surface 6e of the transparent condensing medium 6, and a micro member 8 embedded in the light-condensed surfaces 6b of the transparent condensing medium 6.

The transparent condensing medium 6 is made of, for example, dense flint glass (refractive index=1.91), and has an incident surface where the parallel beam 2b enters, a reflecting surface 6e reflecting the parallel beam 2b entering the incident surface 6a, and the light-condensed surface 6b where the light spot 9 is formed. The reflecting surface 6 uses part of a paraboloid of revolution. Let a principal axis of a cross-section (6e) of the paraboloid of revolution be the x-axis, let a vertical axis be the y-axis, and let a focal position be (p, 0). Then, the cross-section (6e) is expressed in the following equation (5):

$$y^2 = 4px \quad (5)$$

In addition, in case light is condensed inside the transparent condensing medium 6 by using the paraboloid of revolution, it is possible to condense the light theoretically without aberration (Hiroshi Kubota, Optics, Iwanami Shoten, p. 283). Therefore, it becomes possible to condense the light spot 9 with a single light-condensing reflector. In addition, in this method, there is no limitation in the numerical aperture NA of the condensed light that is caused by the refractive index of the transparent condensing medium 6 and the reflecting surface 6e. Therefore, even if the refractive index is high, the numerical aperture NA can become a value near to one. Hence, the diameter of the light spot at this time is expressed in the following equation (6);

$$D_{1/2} = k\lambda/(n \cdot NAr) \quad (6)$$

Here, NAr: Numerical aperture of reflected light on to reflecting surface 6e.

When the distance p of a focal position of the paraboloid of revolution is 0.125 mm and an upper end of the paraboloid of revolution be (x, y)=(2 mm, 1 mm), a convergent angle from this upper end becomes 60° or larger, and the numerical aperture NA of this reflecting surface 6e become 0.98, which is 1.6 times or more to numerical aperture NA=0.6 in a conventional DVD.

In this embodiment the shade 16 is formed on the light output surface of the collimator lens 3. The parallel beam 2b from the semiconductor laser 2 is an ellipse in consideration of a condensation characteristic of the transparent condensing medium 6, and the shade 16 in this embodiment is also an ellipse corresponding to the shape of the elliptic parallel beam 2b.

According to the optical head 1 according to the fifth embodiment to numerical aperture NAr is actually limited to nearly 0.9 for a design margin, but, if a red laser (wavelength: 630 nm) and a blue laser (wavelength; 400 nm) are used, respective diameters of light spots can be reduced down to 0.19 μm and 0.12 μm. Therefore, it is possible to increase the quantity of light, that is, optical efficiency of the near field light 10 leaking out from the micro metal member 8 by nearly 20% in comparison with that in due first embodiment.

Further, the reflective condensing does not arise chromatic aberration.

Furthermore, the optical system of this embodiment is an infinite system, that is, such a system that the laser beam 2b between the collimator lens 3 and incident surface 6a of the transparent condensing medium 6 is parallel. Therefore, the shift of a focal position due to thermal variation can be small.

By the shade 16 provided in the optical path of the laser beam 2b, the erroneous reduction can be prevented similarly to the first embodiment.

Since the paraboloid of revolution is used in the reflecting surface 6e of the transparent condensing medium 6, a position of the light spot 9 is not changed even if a relative position between the parallel beam 2b and transparent condensing medium 6 is shifted. Since the alignment accuracy of each component can be drastically relaxed, this is very advantageous in manufacturing.

Figure 8:
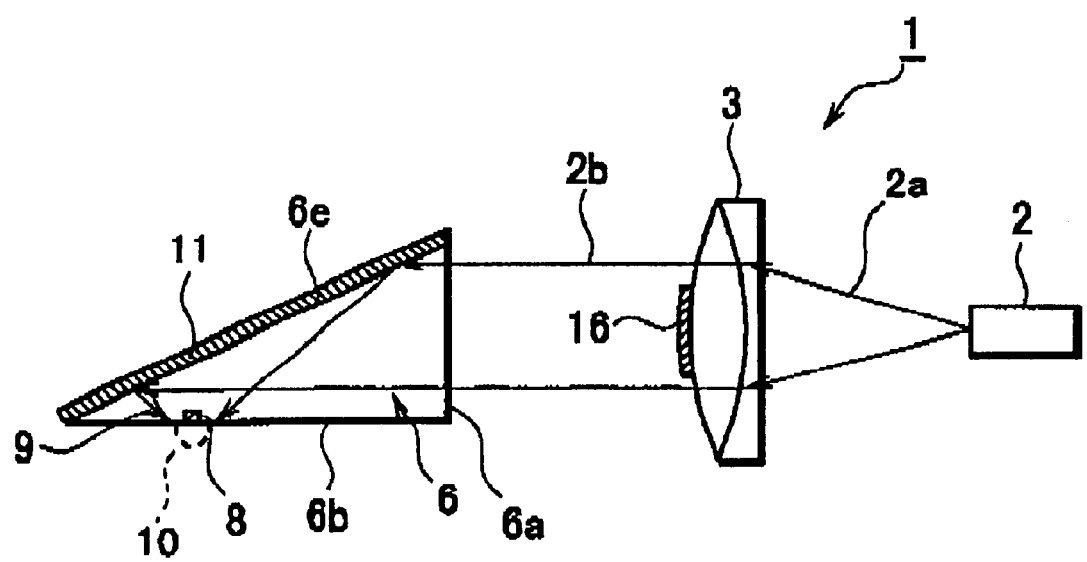
FIG. 8 is a schematic diagram showing a principal part of an optical head according to a sixth embodiment of the part invention.

FIG. 8 shows a principal part of an optical head according to a sixth embodiment of the present invention. This optical head 1 uses a transparent condensing medium 6 having a flat reflecting surface 6e and uses a reflecting type hologram as a reflective film 11 the reflecting surface 6e. Other components are configured similarly to those in the fifth embodiment. Either a binary hologram, which is concave-convex, or a volume hologram, which is made of organic photosensitive material or the like, can be used as the reflection type hologram. Or, a reflective film composed of a highly-reflective metal layer such as an aluminum layer can be arranged on an outside of these hologram. It is possible to increase productivity in comparison with that in the fifth embodiment, by flattening the reflecting surface 6e of the transparent condensing medium 6.

Figure 9A:
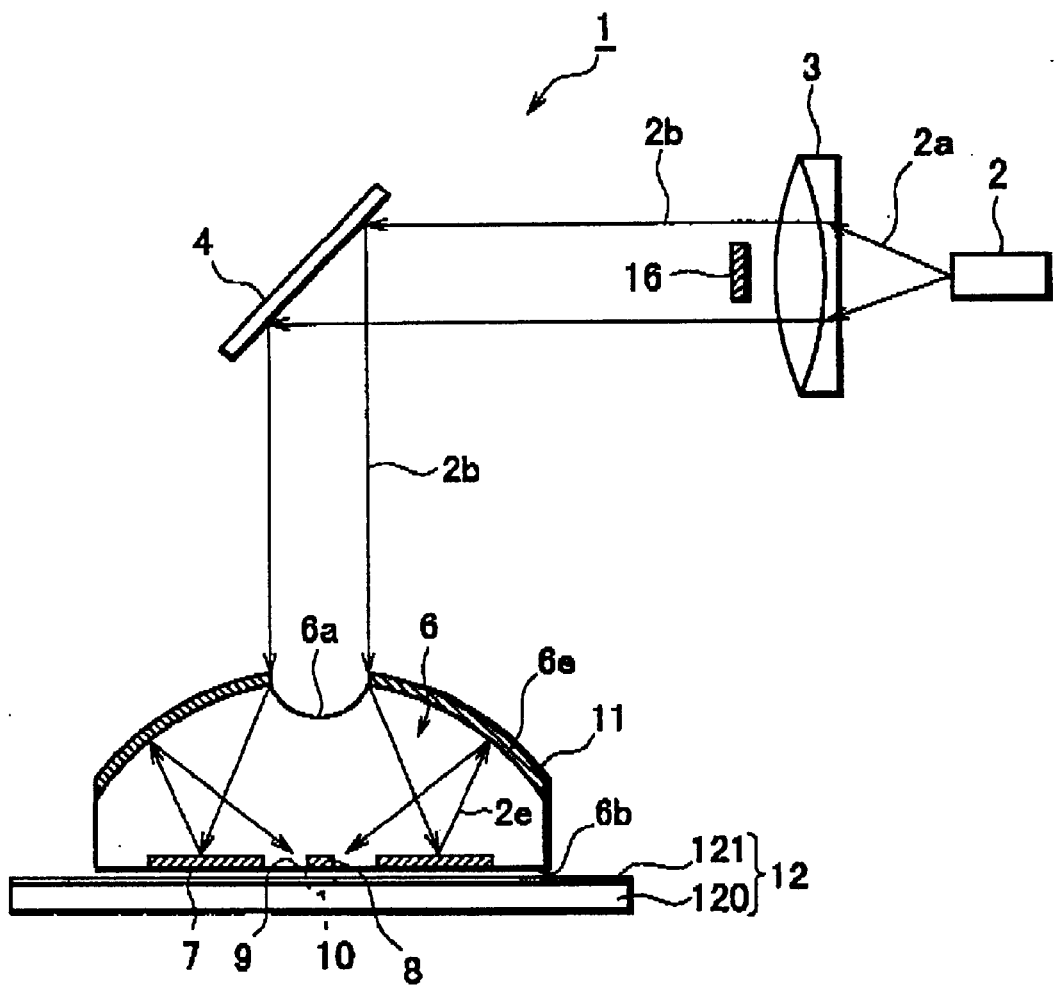
FIG. 9A is a schematic diagram showing a principal part of an optical head according to a seventh part of the present invention.
Figure 9B:
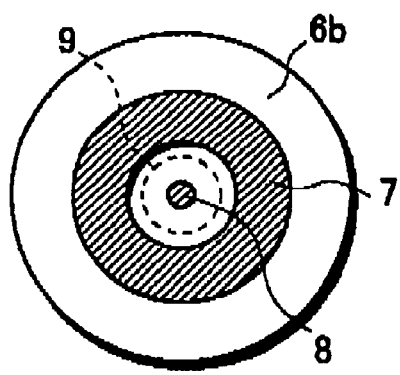
FIG. 9B is its bottom view.

FIGS. 9A to 9B show a principal part of an optical head according to a seventh embodiment of the present invention. This optical head 1, a shown in FIG. 9A, uses a so-called SIM (Solid Immersion Mirror) type material for the transparent condensing medium 6. This optical head 1 has a semiconductor laser 2 emitting a laser beam 2a, a collimator lens 3 shaping the laser beam 2a from the semiconductor laser 2 into a parallel beam 2b, a shade 16 shielding a central part of the parallel beam 2b from the collimator lens 3, a mirror 4 vertically reflecting the parallel beam 1b whose central part is shielded by the shade 16, a transparent condensing medium 6 that has a concave incident surface 6a where the parallel beam 2b from the mirror 4 enters, a light-condensed surface 6b provided at a position of facing the indent surface 6a, and a spherical reflecting surface 6e formed around the incident surface 6a, a reflective film 11 coated and formed on the reflecting surface 6e of the transparent condensing medium 6, a micro metal member 8 provided at a position corresponding to a light spot 9 on the light-condensed surface 6b of the transparent condensing medium 6, and a reflective film 7, having the diameter that is larger than the light spot 9, on the light-condensed surface 6b of the transparent condensing medium 6.

Next, the operation of the optical head 1 according to the seventh embodiment will be described. When a laser beam 2a is emitted from the semiconductor laser 2, the laser beam 2a is shaped by the collimator lens 3, and a central part of the laser beam 2a is shielded by the shade 16. After the laser beam 1a is reflected by the mirror 4, the reflected beam enters the incident 6a of the transparent condensing medium 6. A parallel 2b entering the incident surface 6a is diffused on the incident surface 6a, and the diffused light 2d is reflected on the reflective film 7. The reflected light 2e is reflected on the film 11, and is condensed the light-condensed surface 6b. A light spot 9 is formed on the light-condensed surface 6b, and near field light 10 leaks out from the micro metal member 8. The near field light 10 leaking out from the micro metal member 8 enters a recording medium 121 of a disk 12, and enables to record data to and read data from the recording medium 121.

According to the optical head 1 according to the above-described seventh embodiment, similarly to the first embodiment, it is possible not only to increase recording density in the tracking direction X, but also to simplify configuration since the objective lens used in the first embodiment can be omitted. Since a condensing point is not changed even if the transparent condensing medium 6 expands or shrinks, the optical head 1 can also correspond to a temperature change.

In addition, the diameter of the light spot is nearly 0.2 μm or smaller as described above. Therefore, so as to apply light to the micro metal member 8 whose size is 0.1 μm or smaller, it is necessary to align the light spot 9 and micro metal member 8 within 0.1 μm of tolerance. Condensing using an SIL as shown in the first embodiment condenses with using the objective lens 5 and makes the condensed light enter the SIL, so a position of the light spot 9 is changed by relative positions of the incident light, objective lens 5, and SIL. Hence the above objects must be aligned within high accuracy. On the other hand, in each of optical heads 1 in the fifth and sixth embodiments, by not using an objective lens for condensing and making the parallel beam 2b directly enter the transparent condensing medium 6 in this embodiment, the position of the light spot 9 can be steady even if the relative positions of the parallel beam 2b and transparent condensing medium 6 are shifted. It is very advantageous in manufacturing since alignment accuracy of each component is drastically relaxed.

Figure 10A:
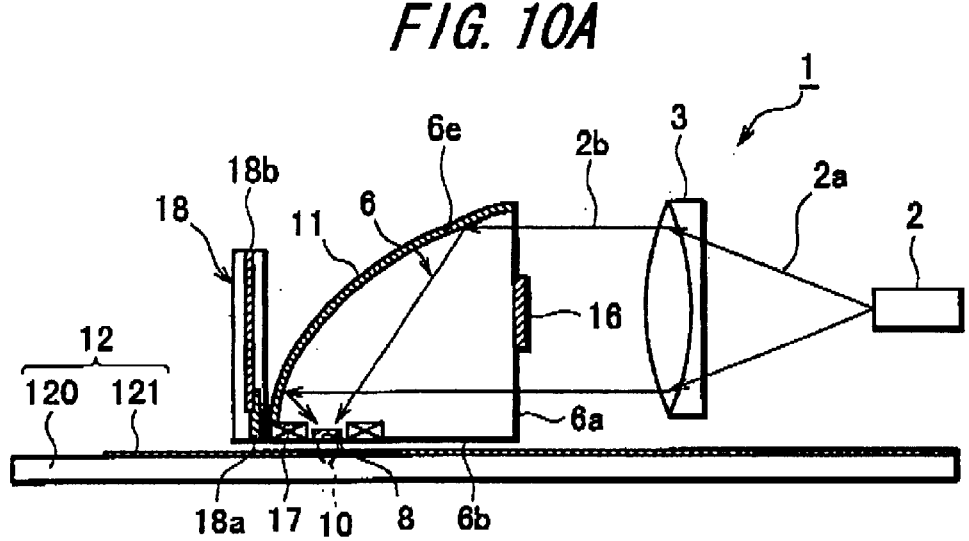
FIG. 10A is a schematic diagram showing a principal part of an optical head according to an eighth embodiment of the present invention.
Figure 10B:
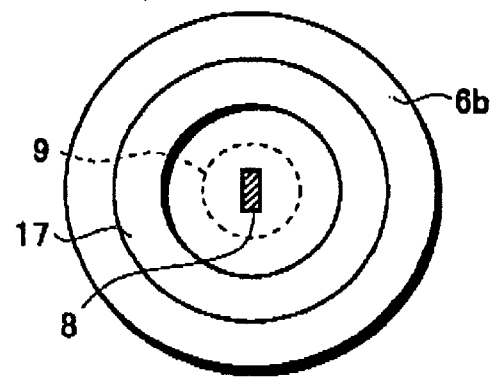
FIGS. 10B and 10C are its principal bottom views.
Figure 10C:
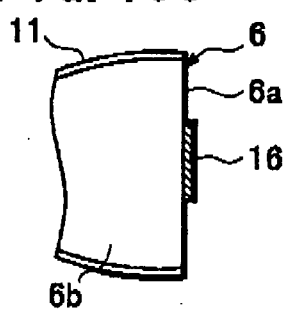
Figure 10D:
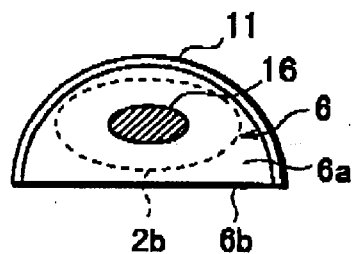
FIGS. 10D to 10F are schematic diagrams showing other shapes of shades.
Figure 10E:
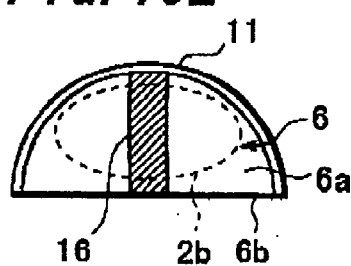
Figure 10F:
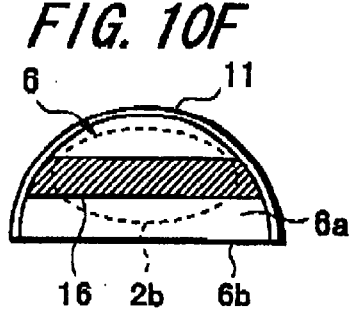

FIGS. 10A and 10F show a magneto-optical head according to an eighth embodiment of the present invention. This embodiment is a magneto-optical head suitable to optical assist magnetic recording. This embodiment is different from the fifth embodiment at points of using a GMR (Giant Magneto-resistive) sensor 18, mainly composed of a spin valve film 18a and an electrode 18b for reproduction, and of using an electromagnet 17 besides a laser beam 10 for recording. Other components are configured similarly to the fifth embodiment. According to such configuration, recording is performed in a magnetic recording medium 121 by irradiating and heating a recording part of the magnetic recording medium 121 with the near field light 10 leaking out from the micro metal member 8, reducing a coercive force thereby, and collaborating with a modulation magnetic field applied by the electromagnet 17. A usual in-plane recording film or a vertical recording film such as a Co—Cr—Ta film magneto-optical recording film such as a TbDyFeCo/TeFeCo film, or the like can be used as the magnetic recording medium 121.

The shade 16 is formed on the incident surface 6a of the transparent condensing medium 6 in this embodiment. The parallel beam 2b from the semiconductor laser 2, as shown in FIG. 10D, is an ellipse in consideration of a condensation characteristic of the transparent condensing medium 6, and the shade 16 in this embodiment is also an ellipse corresponding to the shape of the elliptic parallel beam 2b. In addition, the shape of the shade 16 can be any shape as long as the shape shielding at least the central part of the parallel beam 2b, as shown in FIG. 10 which is a rectangle whose long sides are in the vertical direction. Or a rectangle whose long sides are in the horizontal direction as shown in FIG. 10P, can also be selected.

According to this eighth embodiment, recording is performed by reducing a coercive force through heating the magnetic recording medium 121 by the near field light 10. Therefore, it is possible to perform recording even in a magnetic medium having a high coercive force at room temperature, and hence it is possible to increase thermal stability of a recording data. In consequence, it becomes possible to minify a recording magnetic domain, and hence it is possible to achieve high density. In addition, a semiconductor laser with a shade used in the second embodiment can be also used in each of optical heads in the third to eighths embodiments.

Figure 11A:
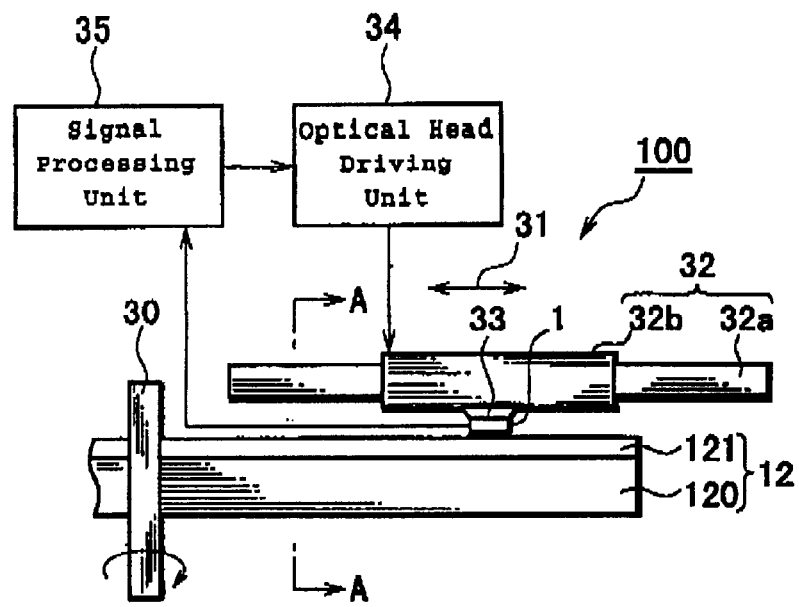
FIG. 11A is a schematic diagram showing a disk apparatus according to a ninth embodiment of the present invention.
Figure 11B:
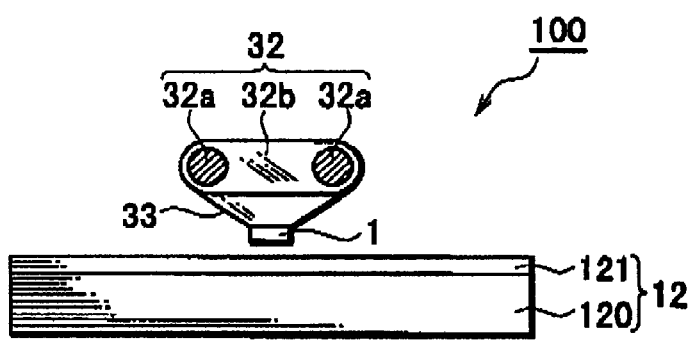
FIG. 11B is a cross-sectional view taken on line A—A of FIG. 11A.

FIGS. 11A and 11B show a disk apparatus according to a ninth embodiment of the present invention. A recording medium 121 made of GeSbTe phase change material is formed on one side of a disk-like plastic plate 120. This disk apparatus 100 has an optical disk 12 rotated by a motor, not shown, through a rotary shaft 30, an optical head 1 performing optical reading and reproduction to the recording medium 121 of the optical disk 12, a linear motor 32 moving the optical head 1 in the tracking direction 31, a suspension 33 supporting the optical head 1 from a side of the linear motor 32, an optical head driving unit 34 driving the optical head 1, and a signal processing unit 35 that not only processes a signal obtained from the optical head 1 but also controls the optical head driving unit 34. The linear motor 32 includes a pair of fixing parts 32 provided along the tracking direction 31, and a moving coil 32b moving on the pair of fixing parts 32a. The optical head 1 is supported by the above-described suspension 33 from this moving coil 32b.

Figure 12:
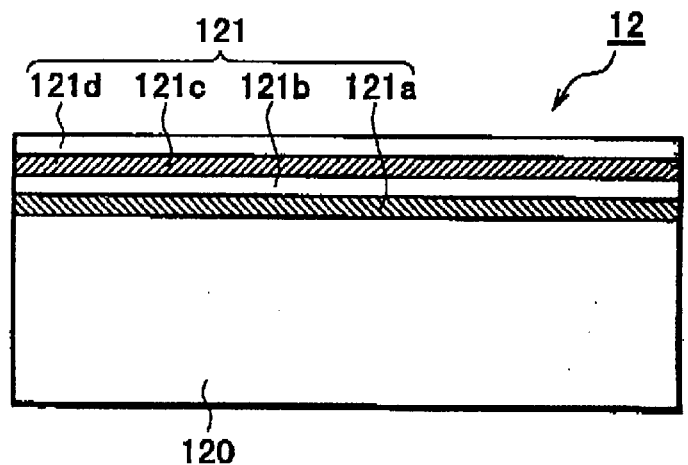
FIG. 12 is a view showing details of an optical disk according to the ninth embodiment.

FIG. 12 shows details of the optical disk 12. This optical disk 12 is designed for the high density recording according to minification of the near field light 10 formed by the optical head 1. A poly-carbonate substrate or the like is used as the plastic plate 120. This optical disk 12 has a recording medium 121 on it one side that is formed by stacking an Al reflective film (100 nm thick) 121a, an $SiO_2$ layer (100 nm thick) 121b, a GeSbTe recording layer (15 mm thick) 121c, and an SIN layer (50 nm thick) 121d. In this embodiment, mark length is 0.05 µm, recording density is 130 Gbits/inch$^2$, and these correspond to the recording capacity of 210 GB in a 12-cm disk. Therefore, it is possible to achieve high recording density that is 45 times as dense as that of a conventional DVD.

Figure 13A:
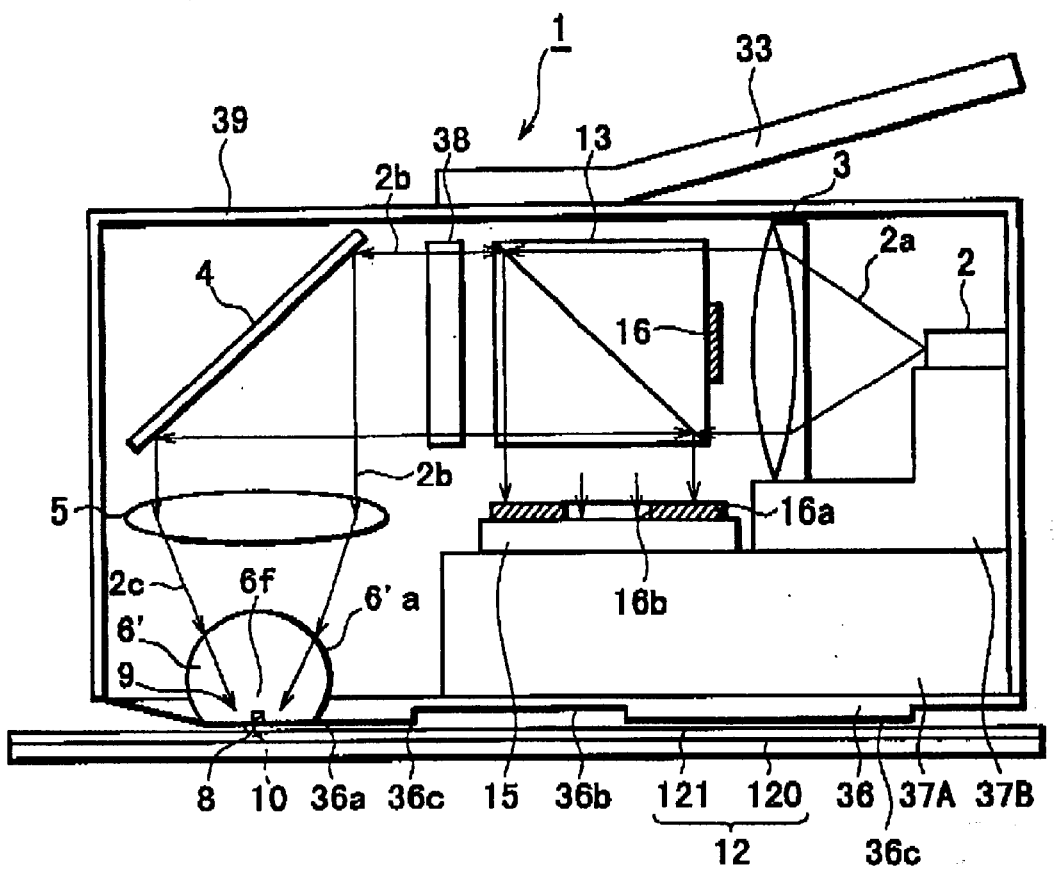
FIG. 13A is a view showing an optical head according to the ninth embodiment.
Figure 13B:
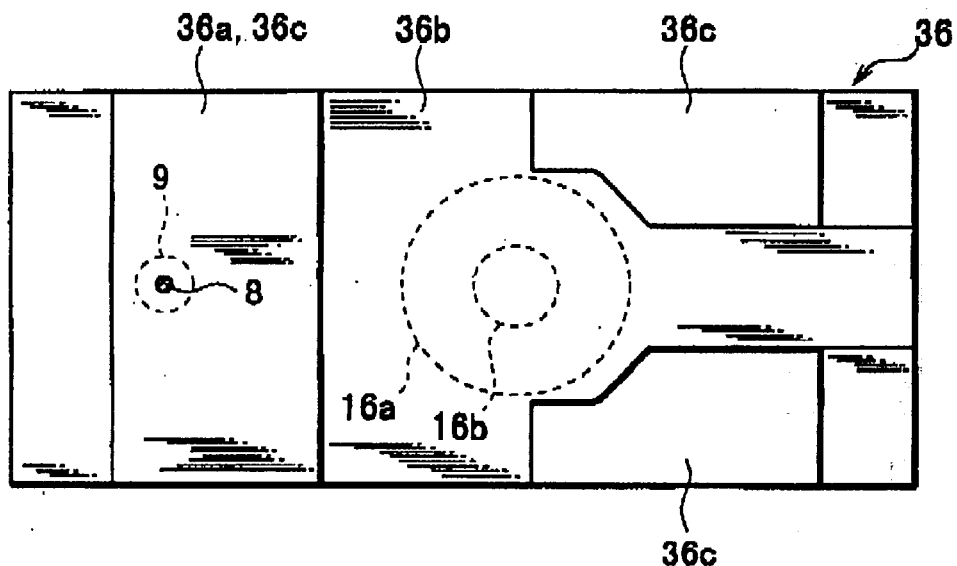
FIG. 13B is its bottom view.

FIGS. 13A and 13B show an optical head 1 according to the ninth embodiment of the present invention. The optical head 1 has a flying slider 36 flying over the optical disk 12. Components on this flying slider 36 are an edge emitting semiconductor laser 2 that is made of AlGaInP and emits a laser beam 2a with the wavelength of 630 nm, a collimator lens 3 shaping the laser beam. 2a emitted from the semiconductor laser 2 into a parallel beam 2b, a seat 37A that is composed of a fused quartz plate and is attached on the flying slider 36, a holder 37B that is composed of a fused quartz plate and fixes the semiconductor laser 2 and collimator lens 3 on the seat 37A, a shade 16 shielding a central part of the parallel beam 2b from the semiconductor laser 2, a polarized beam splitter 13 splitting the parallel 2b from the semiconductor laser 2 and reflected light from the optical disk 12, a quarter wave plate 38 changing the circularly polarized light of the parallel beam 2b from the semiconductor laser 2 to the linearly polarized light, a mirror 4 vertically reflecting the parallel beam 2b, an objective lens 5 and an upper transparent condensing medium 6' that converge the parallel beam 2b reflected by the mirror 4, and a photo detector 15 attached to the seat 37A and inputting the reflected light from the optical disk 12 through the beam splitter 13. All components are contained in a head housing 39, and the head housing 39 is fixed at an end of the suspension 33.

The upper transparent condensing medium 6' is made of, for example, dense flint glass with a refractive index n of 1.91, and has the size of 1 mm diameter and 1.3 mm high. Furthermore, the upper transparent condensing medium 6', similarly to the transparent condensing media 6 shown in FIGS. 1 to 3, has the Super SIL structure, and the flying slider 36 is composed of a clear medium having a refractive index nearly equal to that of the upper transparent condensing medium 6'. The light spot 9 is formed on the light-condensed surface 36a of the flying slider 36. Thus, to upper transparent condensing medium 6' and flying slider 36 construct a transparent condensing medium in one piece. Similarly to the first embodiment, the micro metal member 8 is provided on the light-condensed surface 36a of to flying slider 36.

The flying slider 36, as shown in FIG. 13B, has a groove 36b so that negative pressure occur in apart except a periphery of the light spot 9 formed on the light-condensed 36a. A gap between the flying slider 36 and optical disk 12 is kept as a flying height by means of positive pressure in a convex part 36c of the slider 36, the negative pressure by this groove 36b, and elasticity of the suspension 33.

The optical head driving unit 34 records data as difference of reflectance between crystalline and amorphous caused by a phase change in the recording medium 121 by the irradiation of the laser beam of the semiconductor laser 2 modulated with a recording signal. Furthermore, at the time of reproduction, the system 34 detects the difference of reflectance in the recording medium 121 as the variation of reflected light with the photo detector 15 by continuously applying the laser beam of the semiconductor laser 2 without modulating.

The signal processing unit 35 generates an error signal for tracking control and a data signal on the basis of the reflected light, which is detected by the photo detector 15, from the optical disk 12, separates to error signals in high frequency range and low frequency range respectively by a high-pass filter and a low-pass filter from the error signal, and performs tracking control for the optical head driving unit 34 on the basis of these error signals. Here, the error signals for tracking are generated by a sample servo system (Optical disk technology, Radio Technology Co., Ltd., p. 95). This sample servo system is a system of providing wobbled marks on a tack intermittently, and generating error signals based on the on variation of the reflection intensity from them. In the case of the sample servo system, since a recording signal and tracking error signals are separated in time-sharing, separation of them is performed by a gate circuit of a reproduction circuit. Since the sample servo system requires a photo detector with one photo-detecting surface, a semiconductor laser having a self-connection effect can be used as a photo detector at the same time. This system as preferable to the combination with a so-called SCOOP system. Therefore, to perform SCOOP type photo detection, an antireflection film on an end face of an output side of the semiconductor laser 2 may be coated, then a resonator for the semiconductor laser 2 can be constructed by functioning a rear end face of the semiconductor laser 2 and light-condensed surface 36b or the recording medium 121 as mirrors of the resonator.

In addition, in this embodiment, a shade 16a, which has a predetermined aperture 16b and shields only a periphery of an optical path which only contain the total reflection light reflected directly at the light condensed surface 36a, is inserted before the reproduced light entering the photo detector 15. The total reflection light described above does not have a component of a reproduction signal, and becomes a cause of noise. In addition, the total reflection light is more intense than reproduction signal light from the disk, 12. Therefore, if the total reflection light enters the photo detector 15, the total refection light increases a DC level. Since a DC amplification factor of the photo 15 cannot be increased and a high S/N ratio will be prevented. The total reflection light described above passes through the periphery of the light path and the reflected light of the disk 12 never has an angle larger than a critic angle in the transparent condensing medium 6 theoretically. Therefore, the total reflection light without reproducing data component can be separated by the shade 16a described above and the signal reproduction light from the disk 12 enters the photo detector 15, and hence it becomes possible to perform signal reproduction with the high S/N ratio.

Next, the operation of the disk apparatus 100 according to the ninth embodiment will be described. The optical disk 12 rotates at predetermined speed by a motor not shown. The flying slider 36 flies over the optical disk 12 by an action caused by positive and negative pressure generated by the rotation of the optical disk 12 and the elasticity of the suspension 33. When the laser beam 2a is emitted from the semiconductor laser 2 by driven by the optical head driving unit 35, the laser beam 2a from the semiconductor laser 2 is shaped into the parallel beam 2b by the collimator lens 3. After that, the parallel beam 2b shielded by the shade 16 for its central part, and enters an incident surface 6'a of the upper transparent condensing medium 6' through a polarizing beam splitter 13 and the quarter wave plate 38. The parallel beam 2b is changed from linear polarized light to circularly polarized light by the quarter wave plate 33 when passing through the quarter wave plate 38. The parallel beam 2b that is the circularly polarized light is converged by the objective lens 5, and is refracted and condensed in the incident surface 6'a of the upper transparent condensing medium 6' and condensed in the light-condensed surface 36a of the flying slider 36. The minute light spot 9 is on the light-condensed condensed surface 36a of the flying slider 36. Part of light of the light spot 9 leaks out from the micro metal member 8 under this light spot 9 as the near field light 10 to the outside of a lower surface 36c of the flying slider 36. Then, this near field light 10 propagates to the recording medium 121 of the optical disk 12, and the recording and reproduction is performed. Thus, the recording medium 121 is heated to higher than a fusing point by irradiated with the near field light 10 and then a phase change from amorphous to crystalline is occurred. On the other hand, when the near field light 10 that is weaker than that at the time of recording irradiates on the recording medium 121 of the optical disk 12, the near field light 10 is reflected with different reflectance at amorphous and crystalline portion of the recording medium 121. The reflected light inversely traces along the path of the incident light, and is refracted in the incident surface 6'a of the upper transparent condensing medium 6' to be reflected by the mirror 4. Furthermore, the reflected light is shaped into the linearly polarized light, whose polarization is different by 90° from the incident beam 2a and a polarized plane, by the quarter wave plate 38. After that, the reflected light is reflected in the orthogonal direction by the polarizing beam splitter 13 to enter the photo detector 15, and reproduction is performed. The signal processing unit 35 generates an error signal for tracking control and a data signal on the basis of the reflected light which enters photo detector 15, from the optical disk 12, and performs tracking control for the optical head driving unit 34 on the basis of the error signal.

According to the disk apparatus 100 according to the above-described ninth embodiment, a maximum reflective angle in the incident surface 6'a of the upper transparent condensing medium 6' becomes 60°, and NA becomes 0.86. In consequence, the spot diameter $D_{1/2}$ of the minute light spot is nearly 0.2 μm. Therefore, since the near field light 10 leaking out from the micro metal member 8, whose size is 50 nm, can be applied to the recording medium 121 of the optical disk 12, the optical recording and reproduction at ultra-high-density (180 Gbits/inch$^2$) can be possible.

In addition, the laser beam 2b emitted from the semiconductor laser 2 is shielded by the shade 16 for its central part and does not enter the transparent condensing medium 6. Since the propagation light being generated from the light-condensed surface 36a can be prevented, the erroneous reproduction caused by the propagation light can be prevented either.

Furthermore, since the recording signal and tracking signal are separated in time-sharing because of the use of the sample servo system, a split type photo detector is not necessary as the photo detector 15. For example, a 1 mm-square PIN photo diode can be amplified. Since it is not necessary that the photo detector 15 is the spilt type detector, the detection system can be drastically simplify and lighten.

Furthermore, since the size of to optical head 1 is nearly 8 mm long, nearly 4 mm wide, and nearly 6 mm high and recording and reproduction can be performed without an automatic focusing control, then it is possible to drastically reduce the weight of the optical head 1 and to miniaturize the optical head 1. The weight of the optical head 1 was nearly 0.6 g, and was nearly 2 g at all moving portions with including the weight of the moving-coil 32b of the linear motor 32 or the like. A tracking frequency band was 50 kHz, and the gain was 60 or more.

In addition, since eccentricity can be decreased to 25 $\mu$m, the tracking fulfilling required accuracy of 5 nm under the rotation of 6000 rpm can be performed. Since an average transfer rate in this case is 60 Mbps, recording and reproduction of a video signal can be performed at a UGA level.

Furthermore, it is possible to use various types of recording media such as a read-only disk having convex and concave pits, a recording and reproduction medium using magneto-optical recording material or phase change material, and write once type material performing recording by forming concave and convex pits through optical absorption of dye or the like, as an optical recording medium.

It is also possible to use an unpolarized beam splitter instead of the polarized beam splitter 13 without using the quarter wave plate 38 for irradiating a linearly polarized laser beam on an optical disk.

In the disk apparatus of this embodiment, the optical head in the first embodiment is used as an optical head, but the present invention is not limited to this, but each of the optical heads in the second to eighth embodiment can be used. It is also possible to use the magneto-optical head in the eighth embodiment and configure a disk apparatus performing optical assist magnetic recording by using a magnetic recording medium such as an in-plane recording film or a vertical recording film such as a Co—Cr—Ta film, a magneto-optical recording film such as a TbDyFeCo/TeFeCo film, or the like, as a recording medium.

Although the sample servo system is used for generation of an error signal for tracking control in this embodiment, a wobbled track system can be used, either. The wobbled track system is such a system that a recording track is peripherally meandered, modulation of reflected light thereby is detected with synchronizing with a meandering frequency, then an error signal is generated.

In addition, it is possible to use a three-spot system for the tracking of a playback-only disk as performed for CDs. The error signal is obtained by inserting a diffraction grating between the collimator lens 3 and polarized beam splitter 13, locating respective photo detecting elements, which detect a respective reflected light of the first order light from a disk, in both sides of a main beam detecting element, and generating the difference of the outputs of the photo elements.

Furthermore, the optical head 1 in this embodiment can be used for record to and reproduction from a write once type optical disk (a disk where concave and convex pits are formed by optical absorption of dye) as it is.

Moreover, magneto-optical recording of using a magneto-optical medium becomes possible by attaching a film coil in a periphery of a position, where the light spot 9 is formed, on the lower surface 36c of the flying slider 36, and performing magnetic field modulation. At the time of reproduction, a signal is generated by detecting the rotation of an optical polarized surface with the polarization analysis, it is necessary to detach the quarter wave plate 38, to change the polarized beam splitter 13 to an unpolarized splitter and to locate a polarization detector before the photo-detecting element.

The edge emitting semiconductor laser is used as a laser source in this embodiment, it is also possible to use a vertical cavity surface emitting laser (VCSEL). Although a maximum output of the surface emitting semiconductor laser in a basic mode (TEM00) is nearly 3 mW, that is, one-tenth or less of that of the edge emitting semiconductor laser, the diameter of an light spot in this embodiment is condensed to a fraction of one of that in a conventional disk apparatus. Since optical density can be increased to one-digit or higher, even the surface emitting semiconductor laser can be used for recording. Furthermore, in case of the surface emitting semiconductor laser, since the wavelength of the surface emitting laser is hardly fluctuated due to the temperature, correction of chromatic aberration becomes unnecessary.

FIGS. 14A to 14C show a principal part of an optical head of a disk apparatus according to a tenth embodiment. In an optical disk 1 in this disk apparatus, a holding portion 36d receiving a transparent condensing medium 6 is formed in a flying slider 36, and a pair of piezoelectric elements 41 and 41 making the transparent condensing medium 6 scan in the tracking direction 40 are provided in the flying slider 36 with a holder 42. In addition, other components are configured similarly to those in the disk apparatus 100 according to the ninth embodiment. This transparent condensing medium 6 has a light-condensed surface 6c. Although the light-condensed surface 6b can be protruded to or recessed from a lower surface 36c for the adjustment of distance from an optical disk, the light-condensed surface 6b is arranged so that the light-condensed surface 6b is almost flat with the lower surface 36c of the flying slider 36.

The pair of piezoelectric elements 41 and 41, as shown in FIG. 14C, is composed of a plural electrode film 411 connected to electrode terminals 410 and 410, and a multiple layer PZT film (nearly 20 $\mu$m thick) 412 between the electrode films 411. Each of these piezoelectric 41 and 41 is coated and formed on the holder 42, and this pair of piezoelectric elements 41 and 41 supports the transparent condensing medium 6 and performs scanning in the direction vertical to a laser beam, that is, the tracking direction 40. In this manner, by making push-pull tracking operation by using the pair of piezoelectric elements 41 and 41, it becomes possible to avoid a hysteresis effect of a piezoelectric element and to perform tracking without time-lag. In addition, the transparent condensing medium 6 can be actuated in the direction of an optical axis by using a piezoelectric element whose deformation direction is the direction of the optical axis.

According to the disk apparatus according to the above-described tenth embodiment, the weight of the transparent condensing medium 6 can be 5 mg or lighter. Therefore, the resonance frequency of a system supporting transparent condensing medium 6 can be 300 KHz or higher, the displacement can be 0.5 $\mu$m or larger when a voltage of 5 V is applied between the electrode terminal 410 and 410.

In addition, owing to two-step control by this piezoelectric element 41 and linear motor 32, a frequency band of 300 KHz can be obtained with the gain of 80 dB, and the tracking can be performed at the accuracy of 5 nm under high-speed rotation (3600 rpm). In this embodiment, it is possible to increase the transfer rate to six times as high as that in the disk apparatus 100 in the first embodiment, that is, 360 Mbps.

Furthermore, if a multi-beam optical head described later used, the transfer rate becomes eight times, it is possible to obtain the transfer rate of nearly 3 Gbps. Moreover, it is possible to achieve average seek speed of 10 ms is or less in a 12-cm disk. Owing to this, the access time at the rotation speed of 3600 rpm becomes 20 ms or shorter.

Figure 15:
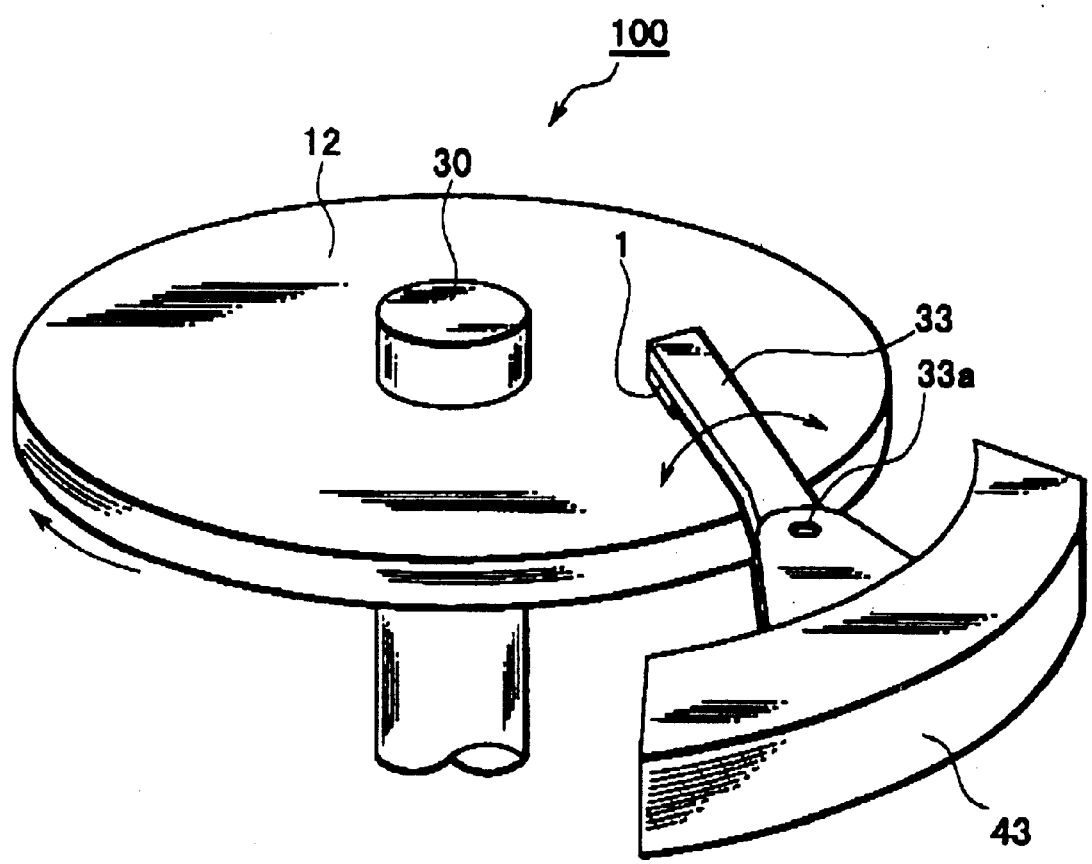
FIG. 15 is a schematic diagram showing a disk apparatus according to an eleventh embodiment of the present invention.
Figure 16:
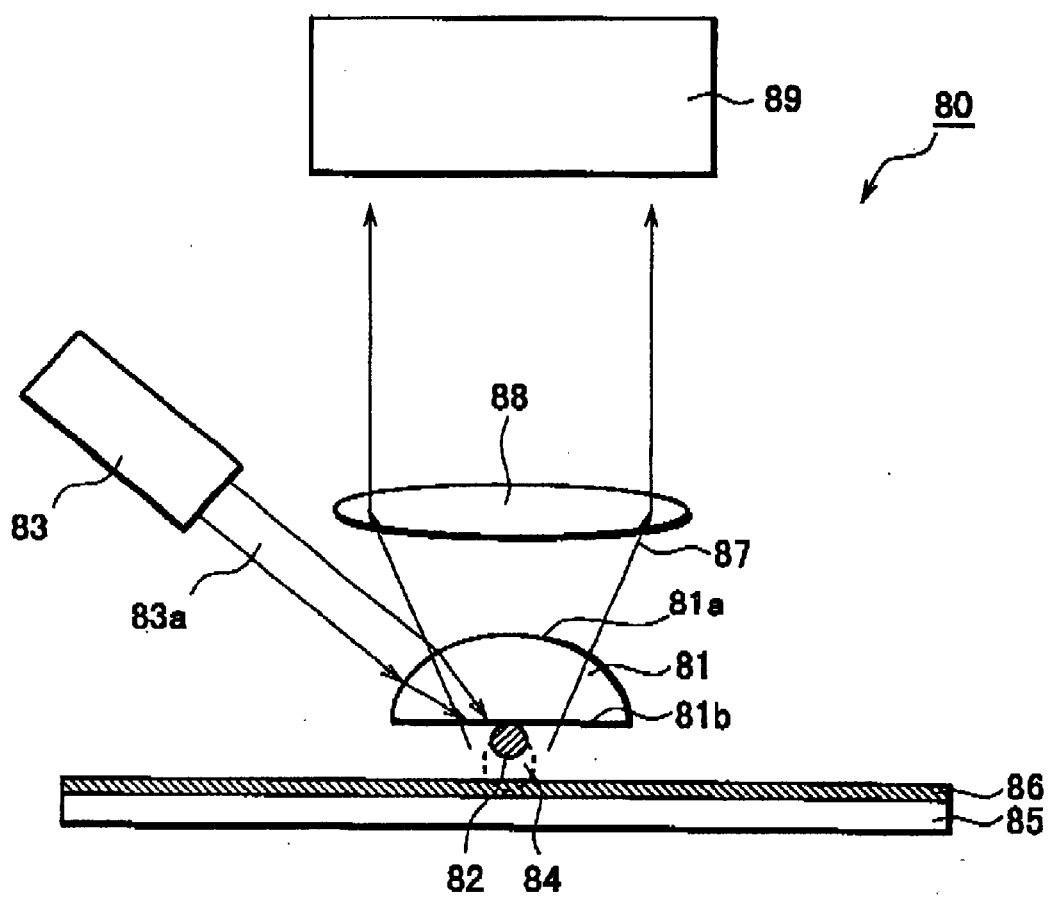
FIG. 16 is a schematic diagram showing a conventional disk apparatus.
Figure 17:
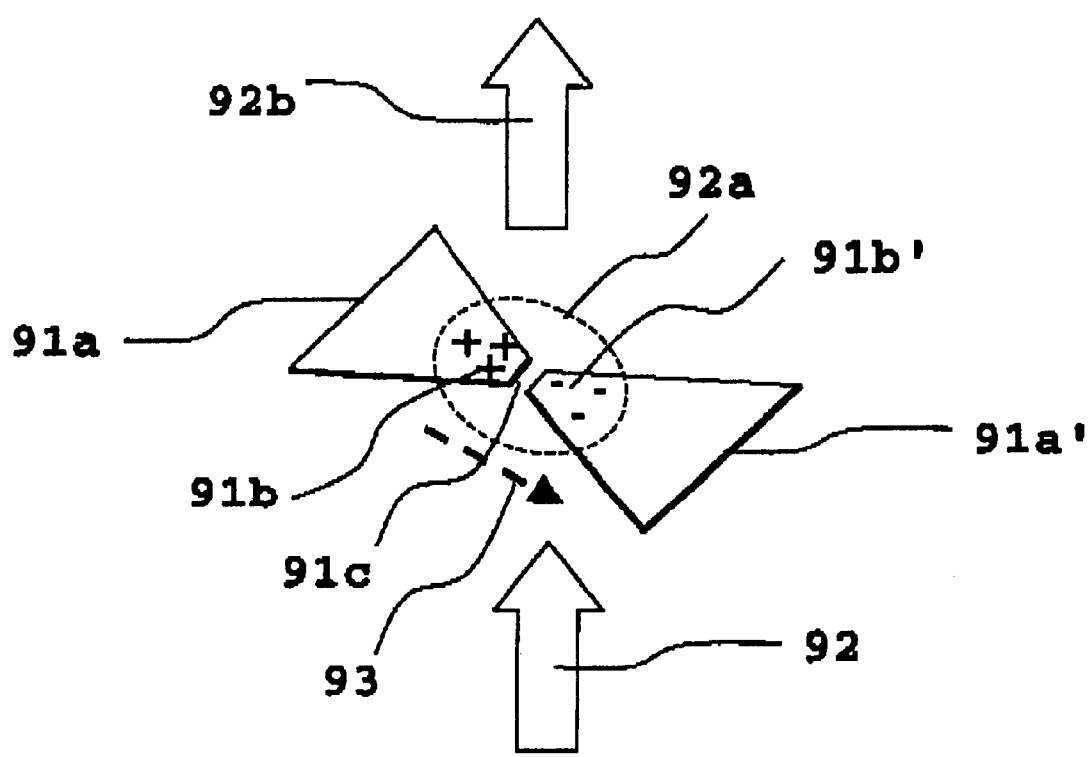
FIG. 17 is a schematic diagram showing a conventional recording method.

FIG. 15 shows a disk apparatus according to an eleventh embodiment of the present invention. Although in the tenth embodiment the linear motor 32 is used for seek operation, in this eleventh embodiment a rotary linear motor 43 used for a hard disk apparatus is used. The optical head 1 is connected to the rotary linear motor 43 with a suspension 33 supported by a pivot 33a. Since the rotary linear motor 43 can be located outside the optical disk 12, it is possible to further thinning the optical head 1, and hence it is possible to miniaturize the oaths disk apparatus 100. In addition, it is possible to rotate the optical disk 12 at high-speed (3600 rpm), and the average data transfer rate can reach 360 Mbps or higher.

In the disk apparatus in this embodiment, each of optical heads in the first to eighth embodiments can be used either. An unpolarized beam splitter also can be used instead of the polarized beam splitter 13 without using the quarter wave plate 38, to irradiate a linearly polarized light on the micro metal member 8.

In the above embodiment the shade 16 is provided in the optical path of the parallel beam 2b or on the light output surface of the semiconductor laser 2, but the shade 16 can be also provided on the mirror 4, objective lens 5, or incident surface 6a of the transparent condensing medium 6.

As described above, according to the present invention, minute and high-density near field light is obtained by forming a minute light spot through condensing a laser beam on a light-condensed surface of a transparent condensing medium and arranging a micro metal member near a position where the light spot is formed. Therefore, it is possible to realize high optical efficiency, a high-density recording medium, high-speed recording and reproduction. It may also be possible to use a small and lightweight light source and a photo detector because of the improvement of optical efficiency, and it becomes possible to miniaturize an optical head and to increase a data transfer rate.

Furthermore, since a central part of a laser beam is shielded by a shade, the central part of a laser beam does not enter a transparent condensing medium. Therefore it is possible to prevent a propagation light from being generated from light-condensed surface of a transparent condensing medium, and it is possible to prevent erroneous reproduction caused by the propagation light.

What is claimed is:

1. An optical head comprising:
   a laser emitting a laser beam;
   an optical system that has a transparent condensing medium which condenses the laser beam from the laser source and forms a light spot on a light-condensed surface of the transparent condensing medium;
   a shade provided in an optical path of the laser beam from the laser to the transparent condensing medium and shields a central part of the laser beam; and
   a micro metal member provided so that at least part of the micro metal member is in a position where the light spot is formed and the size of the part of the micro metal member is smaller than that of the light spot.

2. The optical head according to claim 1, wherein the shade has an outer shape designed so that an incident angle of the laser beam entering an incident surface of the transparent condensing medium becomes larger than a critical angle determined by a refractive index of the transparent condensing medium.

3. The optical head according to claim 1, wherein the optical system comprises a shaping lens shaping the laser beam from the laser source into parallel light; and
   the shade is provided in an optical path of the parallel light.

4. The optical head according to claim 1, wherein the shade is provided on an emitting surface of the laser.

5. The optical head according to claim 1, wherein the shade is provided on an incident surface of the transparent condensing medium.

6. The optical head according to claim 1,
   wherein the micro metal member is elliptic, and
   the shade is rectangular and has a side which is optically parallel to an ellipse axis of the micro metal member.

7. The optical head according to claim 1,
   wherein the micro metal member is rectangular whose side is longer than the light spot, and
   the shade is rectangular whose long side is optically parallel to the side of the micro metal member and is longer than the diameter of the light beam.

8. The optical head according to claim 1, wherein the laser is a semiconductor laser emitting the laser beam whose light intensity in a central part is lower than that in a periphery.

9. The optical head according to claim 8,
   wherein the semiconductor laser is an edge emitting semiconductor laser; and
   the shade is provided perpendicularly to an active layer at a position of a light emitting area of a light emission surface of the edge emitting semiconductor laser.

10. The optical head according to claim 8,
    wherein the semiconductor laser is a surface emitting semiconductor laser; and
    the shade is rectangular and separates an aperture of a light emission surface of the surface emitting semiconductor laser into two areas.

11. The optical head according to claim 8,
    wherein the semiconductor laser is a surface emitting semiconductor laser; and
    the shade is round and is provided in a center of an aperture of a light emission surface of the surface emitting semiconductor laser.

12. The optical head according to claim 8, wherein the semiconductor laser emits the laser beam in a TEM01 mode or a TEM11 mode.

13. The optical head according to claim 8, wherein the micro metal members are plural, at least a pair of the micro metal members facing each other with a gap therebetween in the light spot.

14. The optical head according to claim 13, wherein micro metal members in the pair face each other in the direction of the polarized direction of the laser beam.

15. An optical head comprising:
    a laser emitting a laser beam whose light intensity in a central part is lower than that in a periphery;
    an optical system that has a transparent condensing medium which condenses the laser beam from the laser and forms a light spot on a light-condensed surface of the transparent condensing medium; and
    a micro metal member provided so that at least part of the micro metal member is in a position where the light spot is formed and the size of the part of the micro metal member is smaller than that of the light spot.

16. The optical head according to claim 15, wherein the laser is a semiconductor laser emitting the laser beam in a TEM01 mode or a TEM11 mode.

17. An optical head, comprising:

a laser emitting a laser beam;

an optical system that has a transparent condensing medium which has a incident surface and a light-condensed surface and condenses the laser beam from the laser and forms a light spot on the light-condensed surface of the transparent condensing medium;

a shade provided in an optical path of the laser beam from the laser to the transparent condensing medium and shields a central part of the laser beam; and a micro metal member provided so that at least part of the micro metal member is in a position where the light spot is formed and the size of the part of the micro metal member is smaller than the size of the light spot, wherein the optical system has a numerical aperture of 0.8 or more of the laser beam entering the incident surface.

18. A magneto-optical head, comprising:

a laser emitting a laser beam;

an optical system that has a transparent condensing medium which condenses the laser beam from the laser and forms a light spot on a light-condensed surface of the transparent condensing medium;

a shade provided in an optical path of the laser beam from the laser to the transparent condensing medium and shields a central part of the laser beam;

a micro metal member provided so that at least part of the micro metal member is in a position where the light spot is formed and the size of the part of the micro metal member is smaller than that of the light spot;

an electromagnet provided near the micro metal member and generates a modulated magnetic field according to recorded information; and a magnetic resistive sensor detecting the recorded information as magnetic information.

19. A disk apparatus comprising:

a disk on which a recording medium is formed;

a laser emitting a laser beam;

an optical system that has a transparent condensing medium which condenses the laser beam from the laser and forms a light spot on a light-condensed surface of the transparent condensing medium;

a shade provided in an optical path of the laser beam from the laser to the transparent condensing medium and shields a central part of the laser beam;

a micro metal member provided so that at least part of the micro metal member is in a position where the light spot is formed and the size of the part of the micro metal member is smaller than that of the light spot; and a moving mechanism relatively moving light outgoing from the micro metal member to the recording medium.

20. The disk apparatus according to claim 19, wherein the micro metal member is rectangular whose side is longer than the light spot;

the shade is rectangular whose long side is optically along the side of the micro metal member and is longer than the diameter of the light beam; and the moving mechanism that performs tracking of an emitting light from the micro metal member in a direction where the side of the micro metal member is orthogonal to a recording track of the recording medium.

21. A disk apparatus comprising:

a disk on which a recording medium is formed;

a laser emitting a laser beam;

an optical system that has a transparent condensing medium which condenses the laser beam from the laser and forms a light spot on a light-condensed surface of the transparent condensing medium;

a first shade provided in an optical path of the laser beam from the laser to the transparent condensing medium and shields a central part of the laser beam;

a micro metal member provided so that at least part of the micro metal member is in a position where the light spot is formed and the size of the part of the micro metal member is smaller than the size of the light spot;

a moving mechanism relatively moving light emitted from the micro metal member to the recording medium;

a detector detecting reflected light, based on a laser beam emitted from the laser to the recording medium through the optical system, through the transparent condensing medium; and a second shade shielding returned light lest the returned light that is part of the laser beam condensed on the light-condensed surface of the transparent condensing medium and is reflected on the light-condensed surface should enter the detector.

\* \* \* \* \*